(12) United States Patent
Bae et al.

(10) Patent No.: US 10,766,484 B2
(45) Date of Patent: Sep. 8, 2020

(54) PARKING ASSISTANCE APPARATUS AND VEHICLE HAVING THE SAME

(71) Applicant: LG ELECTRONICS INC., Seoul (KR)

(72) Inventors: Hyeonju Bae, Seoul (KR); Seongju Ha, Seoul (KR); Jonghwa Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 671 days.

(21) Appl. No.: 15/427,799

(22) Filed: Feb. 8, 2017

(65) Prior Publication Data

US 2018/0099661 A1 Apr. 12, 2018

(30) Foreign Application Priority Data

Oct. 12, 2016 (KR) .................. 10-2016-0131856

(51) Int. Cl.
*B60W 30/06* (2006.01)
*G08G 1/14* (2006.01)
(Continued)

(52) U.S. Cl.
CPC .............. *B60W 30/06* (2013.01); *B60R 1/00* (2013.01); *B62D 15/027* (2013.01);
(Continued)

(58) Field of Classification Search
CPC ......... G08G 1/144; H04W 4/04; G06Q 50/30; B62D 15/0285; B62D 15/027; B62D 15/028; B62D 15/0275; B62D 15/021; B62D 15/0295; B62D 15/025; B62D 1/00; B62D 15/0265; B60W 30/06; B60W 2550/10; B60W 10/20; B60W 2050/146; B60W 2420/42; B60W 30/08; B60W 2420/52; B60W 50/12; B60W 30/095;
(Continued)

(56) References Cited

U.S. PATENT DOCUMENTS 7,825,828 B2 11/2010 Watanabe et al.
8,613,125 B2 12/2013 Jeong et al.
(Continued)

FOREIGN PATENT DOCUMENTS

JP 2007-137171 A 6/2007
KR 10-2013-0050763 A 5/2013
(Continued)

*Primary Examiner* — Tuan C To
*Assistant Examiner* — Paul A Castro
(74) *Attorney, Agent, or Firm* — Birch, Stewart, Kolasch & Birch, LLP

(57) ABSTRACT

A parking assistance apparatus can include a sensor for sensing environment information of a vehicle surrounding area, a display for displaying an image of the vehicle surrounding area; and a processor to determine a parking area within the vehicle surrounding area on which parking is allowable, generate virtual parking lines within the parking area, and control the display to display the virtual parking lines, receive an input selecting a candidate parking space within the virtual parking lines, set the selected candidate parking space as a target parking position, and control a vehicle to be driven to the target parking position.

17 Claims, 29 Drawing Sheets

(51) Int. Cl.
*B60R 1/00* (2006.01)
*B62D 15/02* (2006.01)
*G06K 9/00* (2006.01)

(52) U.S. Cl.
CPC ..... *B62D 15/0285* (2013.01); *G06K 9/00812* (2013.01); *G06K 9/00818* (2013.01); *G08G 1/14* (2013.01); *G08G 1/143* (2013.01); *G08G 1/146* (2013.01); *B60R 2300/806* (2013.01)

(58) Field of Classification Search
CPC ....... B60W 2420/403; B60W 2540/12; B60W 2720/24; B60W 30/09; B60W 30/18; B60W 30/18063; B60W 50/16; B60W 2510/18; B60W 2510/20; B60W 2540/04; B60W 2550/308
See application file for complete search history.

(56) References Cited

U.S. PATENT DOCUMENTS

| | | | |
|---|---|---|---|
| 2009/0091475 A1* | 4/2009 | Watanabe | B60Q 9/005 340/932.2 |
| 2010/0132149 A1 | 6/2010 | Jeong et al. | |
| 2017/0036695 A1* | 2/2017 | Lee | B62D 15/0285 |
| 2019/0054927 A1* | 2/2019 | Hayakawa | B62D 15/0285 |

FOREIGN PATENT DOCUMENTS

| | | |
|---|---|---|
| KR | 10-2013-0119114 A | 10/2013 |
| KR | 10-2016-0031910 A | 3/2016 |
| KR | 10-2016-0061068 A | 5/2016 |
| KR | 10-2016-0066296 A | 6/2016 |
| KR | 10-2016-0114486 A | 10/2016 |

\* cited by examiner

PARKING ASSISTANCE APPARATUS AND VEHICLE HAVING THE SAME

CROSS-REFERENCE TO RELATED APPLICATIONS

The present application claims priority under 35 U.S.C. 119 and 35 U.S.C. 365 to Korean Patent Application No. 10-2016-0131856 filed in the Republic of Korea on Oct. 12, 2016, which is hereby incorporated by reference in its entirety.

TECHNICAL FIELD

The present invention relates to a parking assistance apparatus and a vehicle having the same.

BACKGROUND

A vehicle is an apparatus that transports a user riding therein in a desired direction. A representative example of a vehicle may be an automobile.

A vehicle includes an internal combustion engine vehicle, an external combustion engine vehicle, a gas turbine vehicle, an electric vehicle, etc. according to the type of motor used. The electric vehicle refers to a vehicle with an electric motor and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or a pedestrian. The intelligent vehicle is an advanced vehicle that uses information technology (IT) and is also referred to as a smart vehicle. The intelligent vehicle provides optimal traffic efficiency by introduction of an advanced vehicle system and via association with an intelligent traffic system (ITS).

In addition, research into a sensor mounted in such an intelligent vehicle has been actively conducted. More specifically, a camera, an infrared sensor, radar, a global positioning system (GPS), Lidar, a gyroscope, etc. are used for the intelligent vehicle. Among others, the camera can augment the role of human eyes.

Accordingly, with development of various sensors and electronic apparatuses, a vehicle including a driver assistance function for assisting with driving and improving driving safety and convenience is attracting considerable attention. In particular, there is an increasing interest in automatic parking technologies for automatically parking a vehicle since a driver may have difficulty in parking her or his vehicle.

Among automatic parking technologies, there is a technology to detect a parking lane by using a camera and automatically park a vehicle in a detected parking space within the parking lane. In general, a camera system for finding a parking space, an around view monitoring (AVM) system, which photographs surroundings of a vehicle, or a rear camera may be used.

In addition, there have been proposed technologies for performing image analysis of an image photographed by the camera, grasping characteristics of an object included in the image, and performing an automatic parking function based on the characteristics of an object. However, the image-based automatic parking function has a problem because it will not work in a parking lot that does not have parking lines, since a target parking space is searched for based on parking lines detected from an image.

In addition, since the automatic parking function is provided by directly setting a position of the target parking space in the parking lot through drag and touch or movement key touch interface by a driver, the processing of setting a separate target parking space may cause inconvenience to a driver. Also, there is a high possibility that the parking lot is inefficiently used when the vehicle is parked in the target parking space set by the driver.

Also, the image-based automatic parking function can sense a parking space based on other vehicles, but it has a problem that the driving corridor area or the like is not considered during the processing of sensing a target parking space based on the other vehicles and therefore, sufficient passage space for the other vehicles may be obstructed due to the host vehicle after parking.

Further, when there is no parking space inside the parking lines in a parking lot with parking lines, there may be a safe space outside the parking lines that the vehicle could park in, but there is a problem that the existing automatic parking function cannot detect an allowable parking space outside of the parking lines.

SUMMARY

In order to solve the above-described problems, embodiments provide a parking assistance apparatus and a vehicle having the same, which generate one or more virtual parking lines in an area in which parking is allowable in an area surrounding the vehicle and provide an automatic parking function based on the generated virtual parking lines. Embodiments provide a vehicle including the above-described parking assistance apparatus.

In one embodiment, a parking assistance apparatus includes a sensor configured to sense environments of a vehicle surrounding area; a display configured to display an image of the vehicle surrounding area; and a processor configured to: detect a parking area within the vehicle surrounding area in which parking is allowable, generate virtual parking lines within the parking area, and control the display to display the virtual parking lines, and when an input of selecting a candidate parking space within the virtual parking lines is received, the processor is configured to: set the selected candidate parking space as a target parking position, and control a vehicle to be driven up to the target parking position.

The processor can divide the vehicle surrounding area into the parking area and a no parking area based on environmental information of the vehicle surrounding area that is sensed by the sensor, and the environmental information of the vehicle surrounding area may include at least one piece of information on another vehicle parking pattern, a lane, a parking line, a parking sign, a vehicle driving path, a vehicle moving direction, and another vehicle driving pattern.

The processor can set at least one of a driving corridor area, a parking lot entrance surrounding area, a building entrance surround area, a pedestrian corridor area, and a no parking sign designation area as the no parking area. Also, the processor can determine the driving corridor area based on a vehicle driving path, a vehicle moving direction, and another vehicle parking pattern in the vehicle surrounding area.

When another vehicle does not exist in the vehicle surrounding area, the processor can determine an area from a boundary line of the vehicle surrounding area to a predetermined distance inside the vehicle surrounding area as the parking area. Further, the processor can determine an area from a boundary line of the parking area to a predetermined distance as the driving corridor area. Also, the processor can determine a parking method according to a distance between the vehicle and the boundary line of the vehicle surrounding area and generate the virtual parking lines, which are generated according to the determined parking method to match or correspond to the boundary line.

When another vehicle parked in the vehicle surrounding area is detected, the processor can extract a boundary surface of the detected another vehicle based on the vehicle moving direction and the parking pattern of parked vehicles, determine an area inside a boundary line based on the boundary line extending from the boundary surface of the another vehicle as the parking area, and determine an area up to a predetermined distance outside the boundary line as the driving corridor area. Also, the processor can determine a parking method according to a relationship between the vehicle moving direction and another vehicle parking direction and generate the virtual parking lines according to the determined parking method, in order to match or correspond to the boundary line.

When a parking pattern, in which other vehicles are arranged in a line, in the vehicle surrounding area is detected, the processor can extract a boundary line from the parking pattern of the other vehicles arranged in a line, determine an area inside the boundary line with respect to the boundary line as a first parking area, and determine an area up to a predetermined distance outside the boundary line as the driving corridor area.

The processor can detect a parking method of the parking pattern of the other vehicles and generate virtual parking lines in the first parking area according to the detected parking method. Also, the processor can determine an area outside the driving corridor area as a second parking area and generate virtual parking lines in the second parking area.

When an automatic double parking execution input is received from an input unit, the processor can change a portion of the driving corridor area into the parking area and generate virtual parking lines for a parallel parking method in the parking area.

When a first row parking pattern of other vehicles and a second row parking pattern of other vehicles are arranged on the either side in the vehicle surrounding area is detected, the processor can extract a first boundary line from the first row parking pattern of the other vehicles, extract a second boundary line from the second row parking pattern of the other vehicles, and divide the vehicle surrounding area into the parking area and the no parking area based on the first boundary line and the second boundary line. Also, the processor can generate the virtual parking lines according to the first row parking pattern of the other vehicles in the parking area on a side of the first boundary line, and generate the virtual parking lines according to the second row parking pattern of the other vehicles in the parking area on a side of the second boundary line.

When a distance between the first boundary line and the second boundary line is greater than or equal to a predetermined distance, the processor can generate the virtual parking lines in a parallel parking method for double parking. In addition, the display can display an image of the vehicle surrounding area, in which the image is divided into the parking area and the no parking area.

In addition, the processor can determine a parking method according to a shape of the parking area, and generate the virtual parking lines according to the determined parking method. Further, the processor can generate virtual parking lines for another vehicle according to a parking pattern of the another vehicle and extend the virtual parking lines for the another vehicle to form the candidate parking space.

The processor can detect a parking method matching a parking pattern of another vehicle and generate the virtual parking lines in an empty space of the parking area according to the parking method to form the candidate parking space. Also, the processor can detect a boundary line of the vehicle surrounding area and a parking pattern of other vehicles that are parked in an entire area of a parking lot, and when the boundary line of the vehicle surrounding area does not match a boundary line of the parking pattern of the other vehicles, the processor can generate the virtual parking lines based on the boundary line of the vehicle surrounding area.

Also, the processor can detect parking lines from environmental information on the vehicle surrounding area, which is acquired through the sensor, and determine the parking area and the no parking area based on the parking lines. When a distance between a first parking line disposed on one side and a second parking line disposed on an opposite side is greater than or equal to a predetermined distance, the processor can set a portion of an area between the first parking line and the second parking line as the parking area and generate the virtual parking lines in a parallel parking method for double parking.

When an area except for the outermost parking line among the parking lines is determined as the parking area, the processor can generate the virtual parking lines extending from the existing parking lines. In another embodiment, a vehicle includes the above parking assistance apparatus.

According to the embodiments, the parking assistance apparatus can generate a virtual parking line, in a parking area of a parking lot that does not have parking lines, which does not obstruct passage of another vehicle, thus providing the virtual parking line-based automatic parking function even in a parking lot that does not have any parking lines.

Also, according to embodiments, the parking assistance apparatus can generate a virtual parking line extending from an existing parking line in a parking space which does not obstruct passage of another vehicle (or pedestrian), in a parking lot that has parking lines, thus providing the virtual parking line-based automatic parking function.

DETAILED DESCRIPTION OF THE EMBODIMENTS

Figure 1:
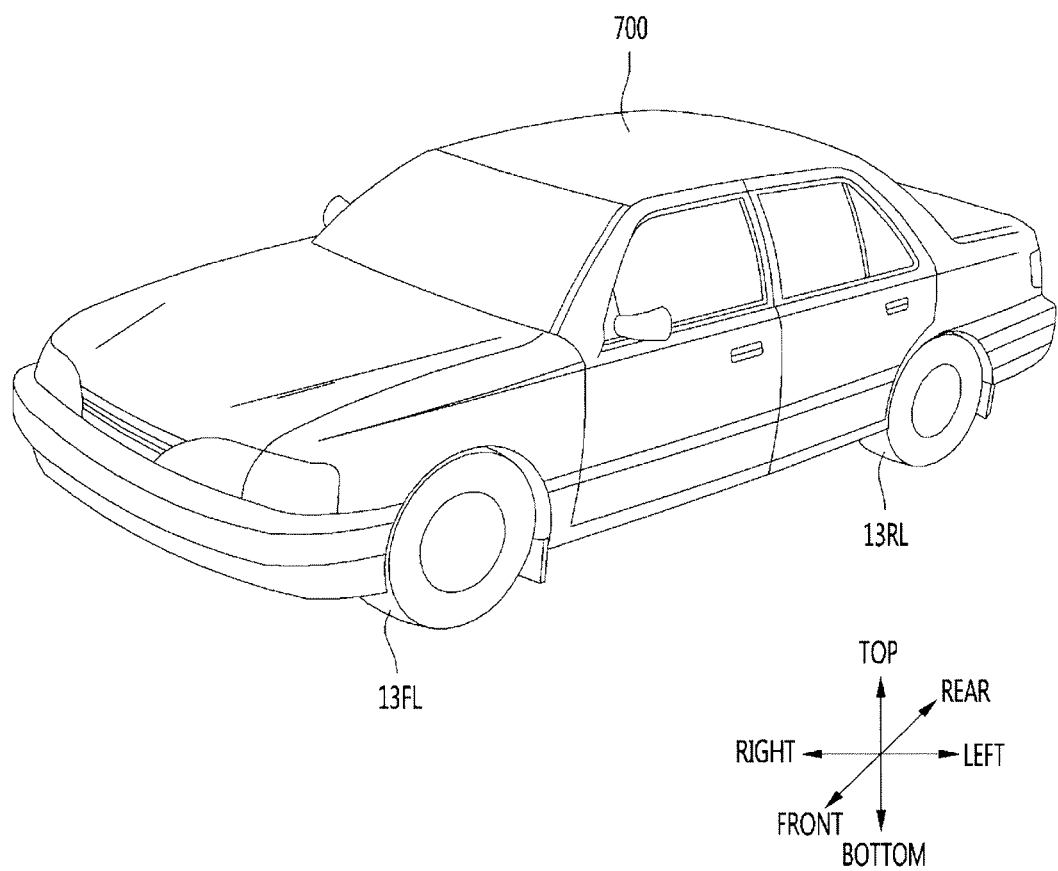
FIG. 1 is a diagram showing the appearance of a vehicle having a parking assistance apparatus according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon. A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle refers to the left of the vehicle in the direction of travel and the right of the vehicle refers the right of the vehicle in the direction of travel. In the following description, a left hand drive (LHD) vehicle will be focused upon unless otherwise stated.

In the following description, the parking assistance apparatus is provided in a vehicle to exchange information necessary for data communication with the vehicle and to perform a parking assistance function. A set of some units of the vehicle may be defined as a parking assistance apparatus.

When the parking assistance apparatus is separately provided, at least some units (see FIG. 2) of the parking assistance apparatus are not included in the parking assistance apparatus but may be units of the vehicle or units of another apparatus mounted in the vehicle. Such external units transmit and receive data via an interface of the parking assistance apparatus and thus may be understood as being included in the parking assistance apparatus.

Figure 2:
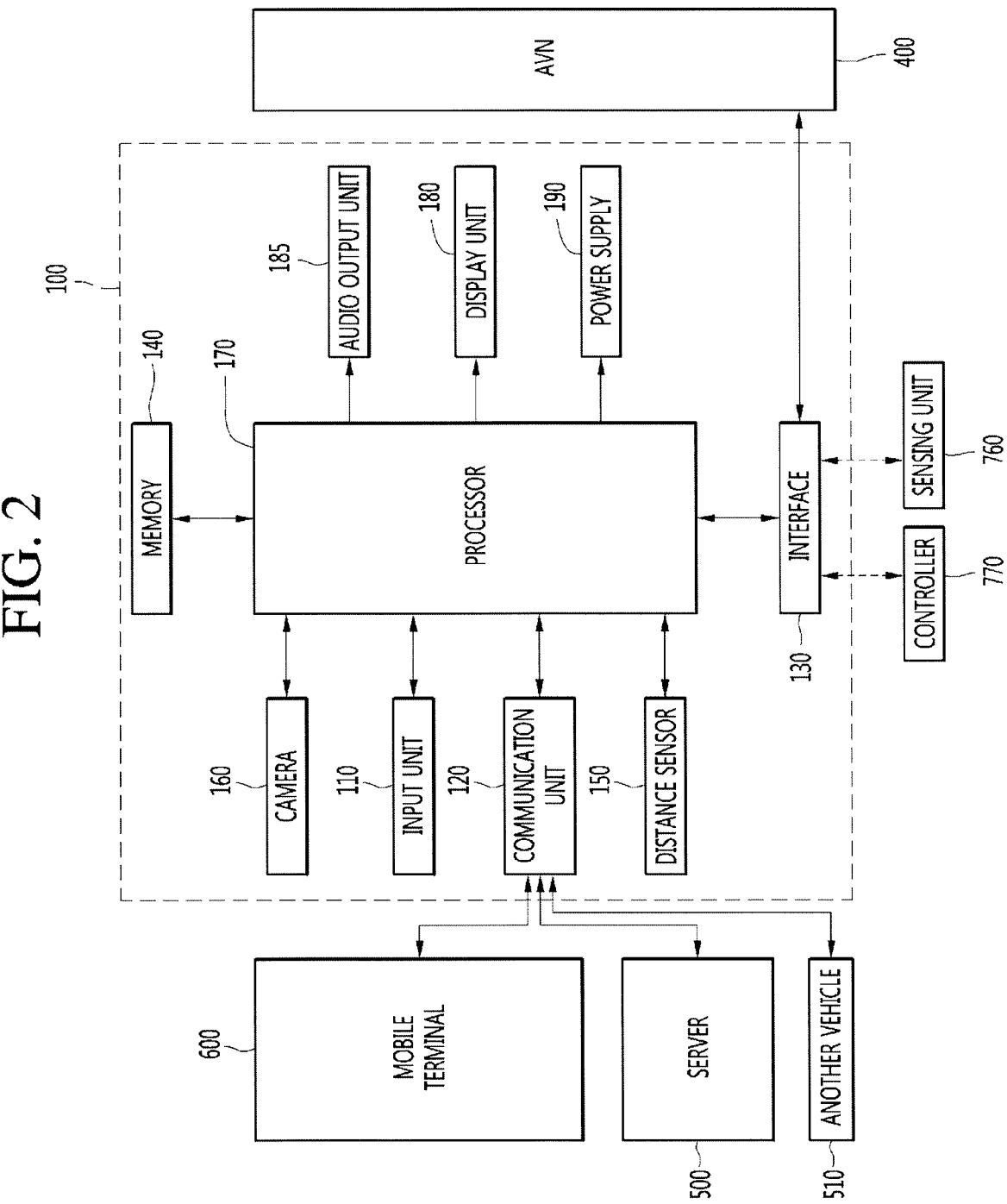
FIG. 2 is a block diagram of a parking assistance apparatus according to an embodiment of the present invention.

Hereinafter, for convenience of description, assume that the parking assistance apparatus according to the embodiment directly includes the units shown in FIG. 2. Hereinafter, the parking assistance apparatus according to the embodiment will be described in detail with reference to the drawings. Referring to FIGS. 1 and 2, a vehicle according to an embodiment may include wheels 13FL and 13RL that rotate by a power source and a parking assistance apparatus 100 that moves a vehicle to a target parking position by controlling the vehicle.

In an embodiment, when an input of performing the automatic parking function is received, the parking assistance apparatus 100 may sense environments of a vehicle surrounding area, divide the vehicle surrounding area into a parking area and a no parking area, generate virtual parking lines within the parking area, and display the virtual parking lines to a user. when an input selecting a candidate parking space within the virtual parking lines is received, the parking assistance apparatus 100 may set the selected candidate parking space as a target parking position and control the vehicle to be driven to the target parking position, thus providing a virtual parking line-based automatic parking function.

Specifically, the parking assistance apparatus 100 may detect a driving corridor area in a parking lot that does not have any existing parking lines (e.g., no painted lines on the ground), in order to avoid obstructing the passage of another vehicle, set the driving corridor area as a no parking area, and generate virtual parking lines in a parking area other than the driving corridor area, thus providing the virtual parking line-based automatic parking function even in a parking lot without existing parking lines.

Also, according to another embodiment, the parking assistance apparatus 100 may generate a virtual parking line or a parking space that extends from an existing parking line, which does not obstruct passage of another vehicle (or pedestrian), in a parking lot that has parking lines, thus providing the virtual parking line-based automatic parking function. The detailed configuration of the parking assistance apparatus 100 will be described below in detail.

Referring to FIG. 2, such a parking assistance apparatus 100 may include an input unit 110, a communication unit 120, an interface 130, a memory 140, a sensor unit 155, a processor 170, a display unit 180, an audio output unit 185 and a power supply 190. The units of the parking assistance apparatus 100 shown in FIG. 2 are examples and thus the parking assistance apparatus 100 described in the present specification may have components greater or less in number than the number of the above-described components.

Each component will now be described in detail. The parking assistance apparatus 100 can include the input unit 110 for receiving user input. A user can make an input of setting an automatic parking function provided by the parking assistance apparatus 100 or turn on/off a power supply of the parking assistance apparatus 100, through the input unit 110. In an embodiment, the input unit 110 can sense an input of performing an automatic parking function, an input of selecting a candidate parking space, or the like. The input unit 110 can include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the parking assistance apparatus 100 can include the communication unit 120 for communicating with another vehicle 510, a terminal 600 and a server 500. The parking assistance apparatus 100 can receive communication information including at least one of navigation information, driving information of another vehicle and traffic information via the communication unit 120. In addition, the parking assistance apparatus 100 can transmit information on this vehicle via the communication unit 120. The communication information can be used to perform the automatic parking function.

In more detail, the communication unit 120 can receive at least one of position information, weather information and road traffic condition information (e.g., transport protocol experts group (TPEG), etc.) from the mobile terminal 600 and/or the server 500. The communication unit 120 can receive traffic information from the server 500 having an intelligent traffic system (ITS). Here, the traffic information may include traffic signal information, lane information, vehicle surrounding information or position information.

In addition, the communication unit 120 can receive navigation information from the server 500 and/or the mobile terminal 600. Here, the navigation information can include at least one of map information related to vehicle driving, lane information, vehicle position information, set destination information and route information according to the destination. For example, the communication unit 120 can receive the real-time position of the vehicle as the navigation information. In more detail, the communication unit 120 can include a global positioning system (GPS) module and/or a Wi-Fi (Wireless Fidelity) module and acquire the position of the vehicle.

In addition, the communication unit 120 can receive driving information from another vehicle 510 and transmit information on this vehicle, thereby sharing driving information between vehicles. Here, the shared driving information can include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the parking assistance apparatus 100 may pair with each other automatically or by executing a user application. The communication unit 120 can exchange data with the other vehicle 510, the mobile terminal 600 or the server 500 in a wireless manner.

In more detail, the communication module 120 can perform wireless communication using a wireless data communication method. Regarding the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) can be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like. Also, the parking assistance apparatus 100 can pair with the mobile terminal located inside the vehicle using a short-range communication method and wirelessly exchange data with the other vehicle 510 or the server 500 using a long-distance wireless communication module of the mobile terminal.

Next, the parking assistance apparatus 100 can include the interface 130 for receiving data of the vehicle and transmitting a signal processed or generated by the processor 170. In more detail, the parking assistance apparatus 100 can receive at least one of driving information of another vehicle, navigation information and sensor information via the interface 130.

In addition, the parking assistance apparatus 100 can transmit a control signal for executing a parking assistance function or information generated by the parking assistance apparatus 100 to the controller 770 of the vehicle via the interface 130. In an embodiment, the interface unit 130 can transmit various control signals used for the processor 170 to control the traveling of the vehicle, or the like to the control unit of the vehicle or a power unit of the vehicle. For example, the interface unit 130 can transmit a power control signal, a steering control signal, a break control signal, or the like, which is generated by the processor 170, to a driving unit of the vehicle, thus controlling the traveling of the vehicle.

Thus, the interface 130 can perform data communication with at least one of the controller 770 of the vehicle, an audio-video-navigation (AVN) apparatus 400 and the sensing unit 760 using a wired or wireless communication method. In more detail, the interface 130 can receive navigation information by data communication with the controller 770, the AVN apparatus 400 and/or a separate navigation apparatus.

In addition, the interface 130 may receive sensor information from the controller 770 or the sensing unit 760. For example, the sensor information can include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information can be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module can include a GPS module for receiving GPS information.

The interface 130 can receive user input via the user input unit 110 of the vehicle. The interface 130 can receive user input from the input unit of the vehicle or via the controller 770. That is, when the input unit is provided in the vehicle, user input can be received via the interface 130.

In addition, the interface 130 can receive traffic information acquired from the server. The server 500 may be located at a traffic control surveillance center for controlling traffic. For example, when traffic information is received from the server 500 via the communication unit 120 of the vehicle, the interface 130 can receive traffic information from the controller 770.

Next, the memory 140 store a variety of data for overall operation of the parking assistance apparatus 100, such as a program for processing or control of the controller 170. In addition, the memory 140 can store data and commands for operation of the parking assistance apparatus 100 and a plurality of application programs or applications executed in the parking assistance apparatus 100. At least some of such application programs can be downloaded from an external server through wireless communication. At least one of such application programs can be installed in the parking assistance apparatus 100 upon release, in order to provide the basic function (e.g., the driver assistance information guide function) of the parking assistance apparatus 100.

Such application programs can be stored in the memory 140 and can be executed to perform operation (or function) of the parking assistance apparatus 100 by the processor 170. The memory 140 can store data for checking an object included in an image. For example, the memory 140 may store data for checking a predetermined object using a predetermined algorithm when the predetermined object is detected from an image of the vicinity of the vehicle acquired through the camera 160.

For example, the memory 140 can store data for checking the object in the image using the predetermined algorithm for identifying whether objects, such as a lane, a traffic sign, a two-wheeled vehicle and/or a pedestrian is included in an image acquired through the camera 160. The memory 140 can be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. Also, the parking assistance apparatus 100 can operate in association with a network storage for performing a storage function of the memory 140 over the Internet.

Next, the monitoring unit can acquire information on the internal state of the vehicle. Information sensed by the monitoring unit can include at least one of facial recognition information, fingerprint information, iris-scan information, retina-scan information, hand geometry information and voice recognition information. The motoring unit may include other sensors for sensing such biometric information (see FIG. 26, 725).

Next, the parking assistance apparatus 100 can further include the sensor unit 155 for sensing objects located in the vicinity of the vehicle. The parking assistance apparatus 100 can include the sensor unit 155 for sensing peripheral objects and can receive the sensor information obtained by the sensing unit 770 of the vehicle via the interface 130. The acquired sensor information can be included in the information on the vehicle surrounding information.

In an embodiment, the sensor unit 155 can detect an object around the vehicle and acquire information about a vehicle surrounding environment for automatic parking. Specifically, the sensor unit 155 can detect one or more boundary lines of the parking lot by detecting a curb or the like, and acquire information about various entrances, a parking pattern of another vehicle or vehicles, a "no-parking" sign, or the like, as environmental information on the vehicle surrounding environment.

Furthermore, the processor 170 can detect a parking area on which parking is allowable and/or a no parking area on which parking is not allowable, based on the environmental information on the vehicle surrounding environment, which is acquired by the sensing unit 760, and generate an appropriate a virtual parking line or lines within the parking area, thus searching for an available parking space.

The sensing unit 760 can include at least one of a distance sensor 150 for sensing the position of an object located in the vicinity of the vehicle and a camera 160 for capturing the image of the vicinity of the vehicle. The distance sensor 150 can accurately sense the position of the object located in the vicinity of the vehicle, a distance between the object and the vehicle, a movement direction of the object, etc. The distance sensor 150 can continuously measure the position of the sensed object to accurately sense change in positional relationship with the vehicle. Also, the distance sensor 150 can sense an object located in at least one of the front, rear, left and right areas of the vehicle. The distance sensor 150 can be provided at various positions of the vehicle.

Figure 3:
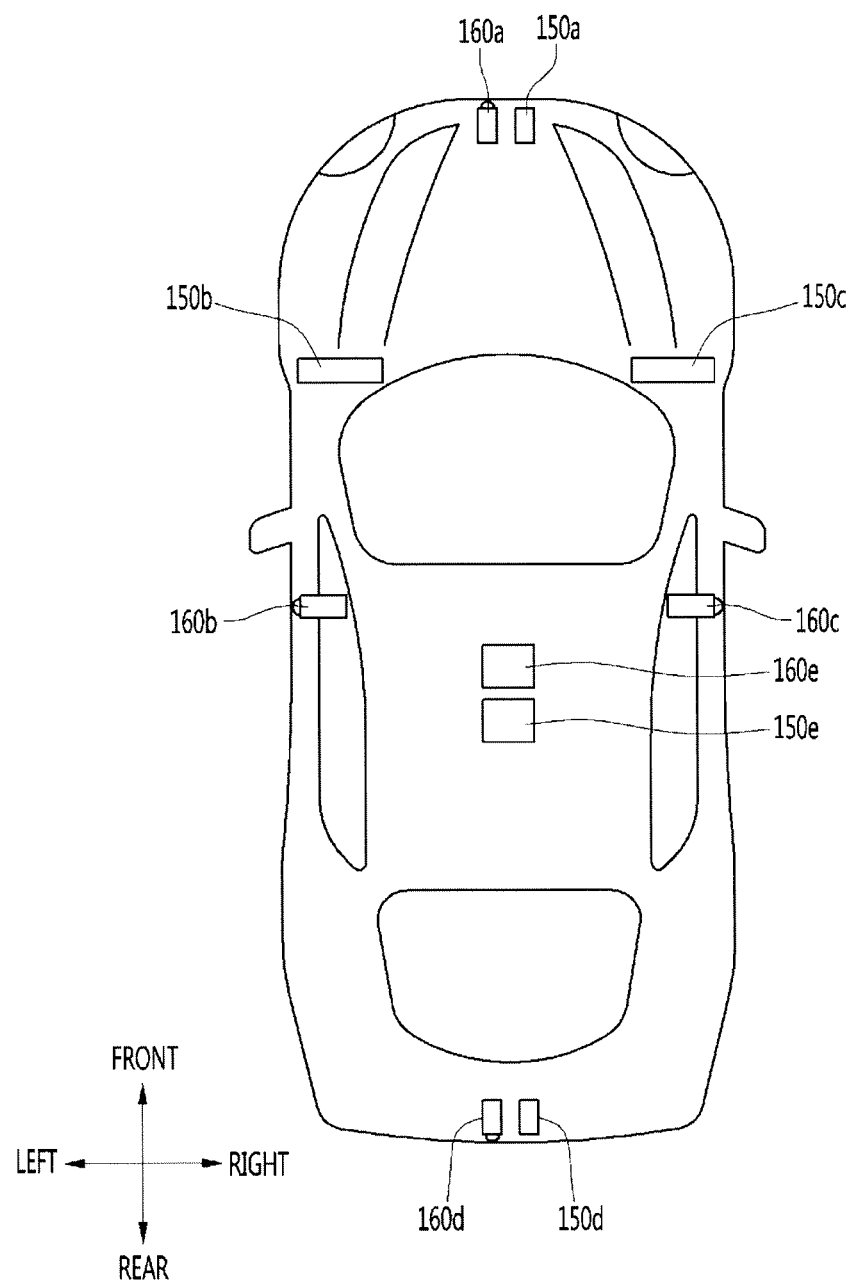
FIG. 3 is a plan view of a vehicle having a parking assistance apparatus according to an embodiment of the present invention.

In more detail, referring to FIG. 3, the distance sensor 150 can be provided at at least one of the front, rear, left and right sides and ceiling of the vehicle (e.g., 150*a*, 150*b*, 150*c*, 150*d* and 150*e*). The distance sensor 150 can include at least one of various distance measurement sensors such as a Lidar sensor, a laser sensor, an ultrasonic wave sensor and a stereo camera. For example, the distance sensor 150 can be a laser sensor that accurately measures a positional relationship between the vehicle and an object using a time-of-flight (TOF) and/or a phase-shift method according to a laser signal modulation method.

Information on the object can be acquired by analyzing the image captured by the camera 160 at the processor 170. In more detail, the parking assistance apparatus 100 may capture the image of the vicinity of the vehicle using the camera 160, analyze the image of the vicinity of the vehicle using the processor 170, detect an object located in the vicinity of the vehicle, determine the attributes of the object and generate sensor information.

The image information is at least one of the type of the object, traffic signal information indicated by the object, the distance between the object and the vehicle and the position of the object and can be included in the sensor information. In more detail, the processor 170 can detect the object from the captured image via image processing, track the object, measure the distance from the object, and check the object to analyze the object, thereby generating image information.

The camera 160 can be provided at various positions. For example, the camera 160 may include an internal camera within the vehicle for capturing an image of the front of the vehicle for acquiring a front image.

Referring to FIG. 3, a plurality of cameras 160 can be provided at least one of the front, rear, right and left and ceiling of the vehicle. In more detail, the left camera 160*b* can be provided inside a case surrounding a left side mirror. Alternatively, the left camera 160*b* can be provided outside the case surrounding the left side mirror. Alternatively, the left camera 160*b* can be provided in one of a left front door, a left rear door or an outer area of a left fender.

Also, the right camera 160*c* can be provided inside a case surrounding a right side mirror. Alternatively, the right camera 160*c* can be provided outside the case surrounding the right side mirror. Alternatively, the right camera 160*c* can be provided in one of a right front door, a right rear door or an outer area of a right fender.

In addition, the rear camera 160*d* can be provided in the vicinity of a rear license plate or a trunk switch. The front camera 160*a* may be provided in the vicinity of an emblem or a radiator grill.

The processor 170 can synthesize images captured in all directions and provide an around view image or surrounding view image as viewed from the top of the vehicle. Upon generating the around view image, boundary portions between the image regions occur. Such boundary portions can be subjected to image blending and/or stitching for natural display. In addition, the ceiling or roof camera 160*e* may be provided on top of the vehicle to capture the image of the vehicle in all directions.

The camera 160 can directly include an image sensor and an image processing module. The camera 160 can process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in an embodiment, the camera 160 can be a stereo camera for capturing an image and, at the same time, measuring a distance from an object. The sensing unit 760 may be a stereo camera including the distance sensor 150 and the camera 160. That is, the stereo camera may acquire an image and, at the same time, sense a positional relationship with the object.

Figure 4:
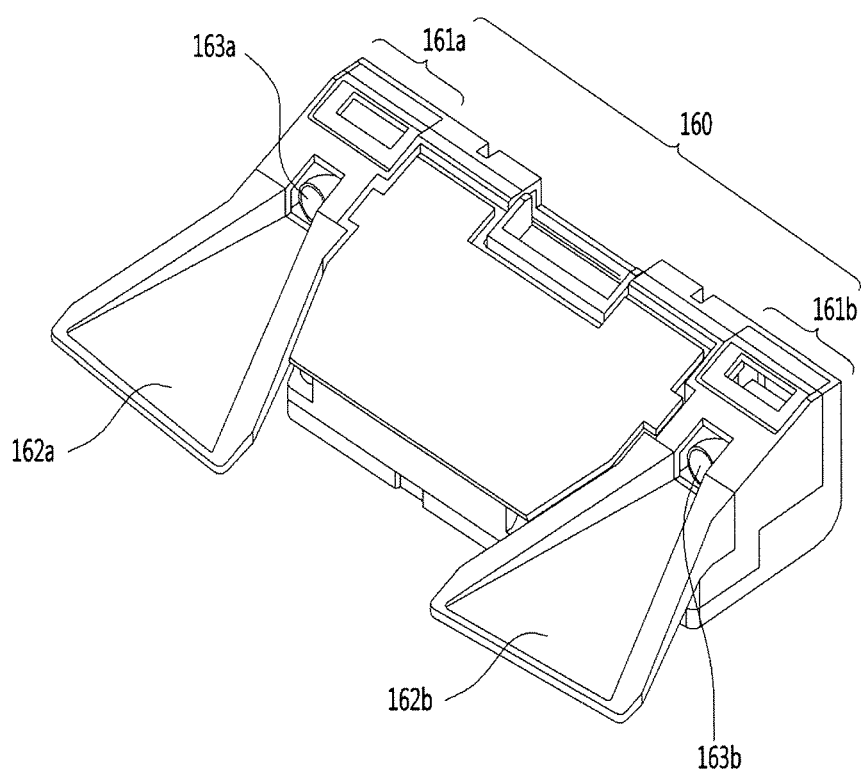
FIG. 4 is a diagram showing an example of a camera according to an embodiment of the present invention.

Hereinafter, referring to FIGS. 4 to 6, the stereo camera and a method of detecting image information by the processor 170 using the stereo camera will be described in greater detail. Referring to FIG. 4, the stereo camera 160 may include a first camera 161*a* including a first lens 163*a* and a second camera 161*b* including a second lens 163*b*.

The stereo camera 160 can further include first and second light shield units 162*a* and 162*b* for shielding light incident upon the first and second lenses 163*a* and 163*b*. The parking assistance apparatus 100 can acquire stereo images of the vicinity of the vehicle from the first and second cameras 161*a* and 161*b*, detect disparity based on the stereo images, detect an object from at least one stereo image, and continuously track movement of the object after object detection.

Figure 5:
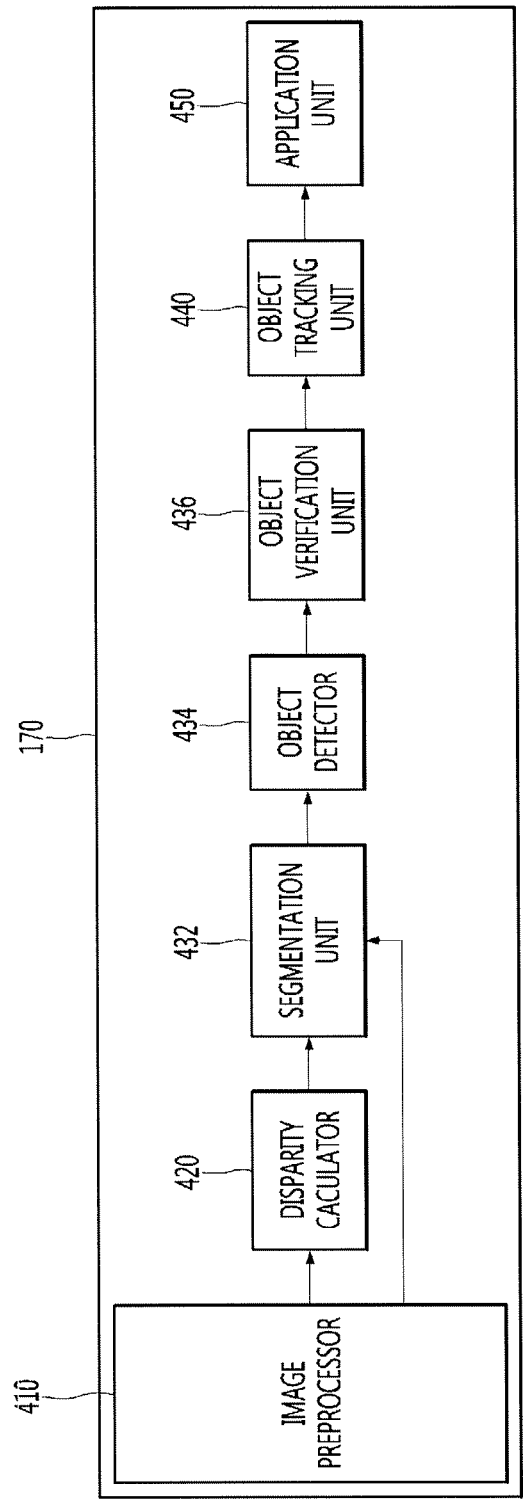
FIGS. 5 and 6 are diagrams illustrating an example of a method of generating image information from an image of a camera according to an embodiment of the present invention.

Referring to FIG. 5, as one example of the block diagram of the internal configuration of the processor 170, the processor 170 of the parking assistance apparatus 100 can include an image preprocessor 410, a disparity calculator 420, an object detector 434, an object tracking unit 440 and an application unit 450. Although an image is processed in an order of the image preprocessor 410, the disparity calculator 420, the object detector 434, the object tracking unit 440 and the application unit 450 in FIG. 5 and the following description, the present invention is not limited thereto.

The image preprocessor 410 can receive an image from the camera 160 and perform preprocessing. In more detail, the image preprocessor 410 can perform noise reduction, rectification, calibration, color enhancement, color space conversion (CSC), interpolation, camera gain control, etc. of the image. An image having definition higher than that of the stereo image captured by the camera 160 can be acquired.

The disparity calculator 420 can receive the images processed by the image preprocessor 410, perform stereo matching of the received images, and acquire a disparity map according to the stereo matching. That is, disparity information of the stereo image of the front side of the vehicle can be acquired.

Also, stereo matching can be performed in units of pixels of the stereo images or predetermined block units. The disparity map can refer to a map indicating the numerical value of binocular parallax information of the stereo images, that is, the left and right images.

The segmentation unit 432 may perform segmentation and clustering with respect to at least one image based on the disparity information from the disparity calculator 420. In more detail, the segmentation unit 432 can segment at least one stereo image into a background and a foreground based on the disparity information.

For example, an area in which the disparity information is less than or equal to a predetermined value within the disparity map can be calculated as the background and excluded. Therefore, the foreground may be segmented. As another example, an area in which the disparity information is greater than or equal to a predetermined value within the disparity map can be calculated as the foreground and extracted. Therefore, the foreground can be segmented. The background and the foreground may be segmented based on the disparity information extracted based on the stereo images to reduce signal processing speed, the amount of processed signals, etc. upon object detection.

In addition, the object detector 434 can detect the object based on the image segment from the segmentation unit 432. That is, the object detector 434 can detect the object from at least one image based on the disparity information.

In more detail, the object detector 434 can detect the object from at least one image. For example, the object can be detected from the foreground segmented by image segmentation.

Next, the object verification unit 436 can classify and verify the segmented object. Thus, the object verification unit 436 can use an identification method using a neural network, a support vector machine (SVM) method, an identification method by AdaBoost using Haar-like features or a histograms of oriented gradients (HOG) method.

The object verification unit 436 can compare the objects stored in the memory 140 and the detected object and verify the object. For example, the object verification unit 436 can verify a peripheral vehicle, a lane, a road surface, a traffic sign, a danger zone, a tunnel, etc. located in the vicinity of the vehicle.

The object tracking unit 440 can track the verified object. For example, the objects in the sequentially acquired stereo images can be verified, motion or motion vectors of the verified objects can be calculated and motion of the objects can be tracked based on the calculated motion or motion vectors. A peripheral vehicle, a lane, a road surface, a traffic sign, a danger zone, a tunnel, etc. located in the vicinity of the vehicle can be tracked.

Next, the application unit 450 can calculate a degree of risk, etc. based on various objects located in the vicinity of the vehicle, for example, another vehicle, a lane, a road surface, a traffic sign, etc. In addition, the possibility of collision with a preceding vehicle, whether a vehicle slips, etc. can be calculated.

The application unit 450 can output a message indicating such information to the user as driver assistance information based on the calculated degree of risk, possibility of collision or slip. Alternatively, a control signal for vehicle attitude control or driving control can be generated as vehicle control information.

The image preprocessor 410, the disparity calculator 420, the segmentation unit 432, the object detector 434, the object verification unit 436, the object tracking unit 440 and the application unit 450 can be included in an image processor of the processor 170.

In some embodiments, the processor 170 can include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 can be excluded. In some embodiments, the segmentation unit 432 can be excluded.

Figure 6:
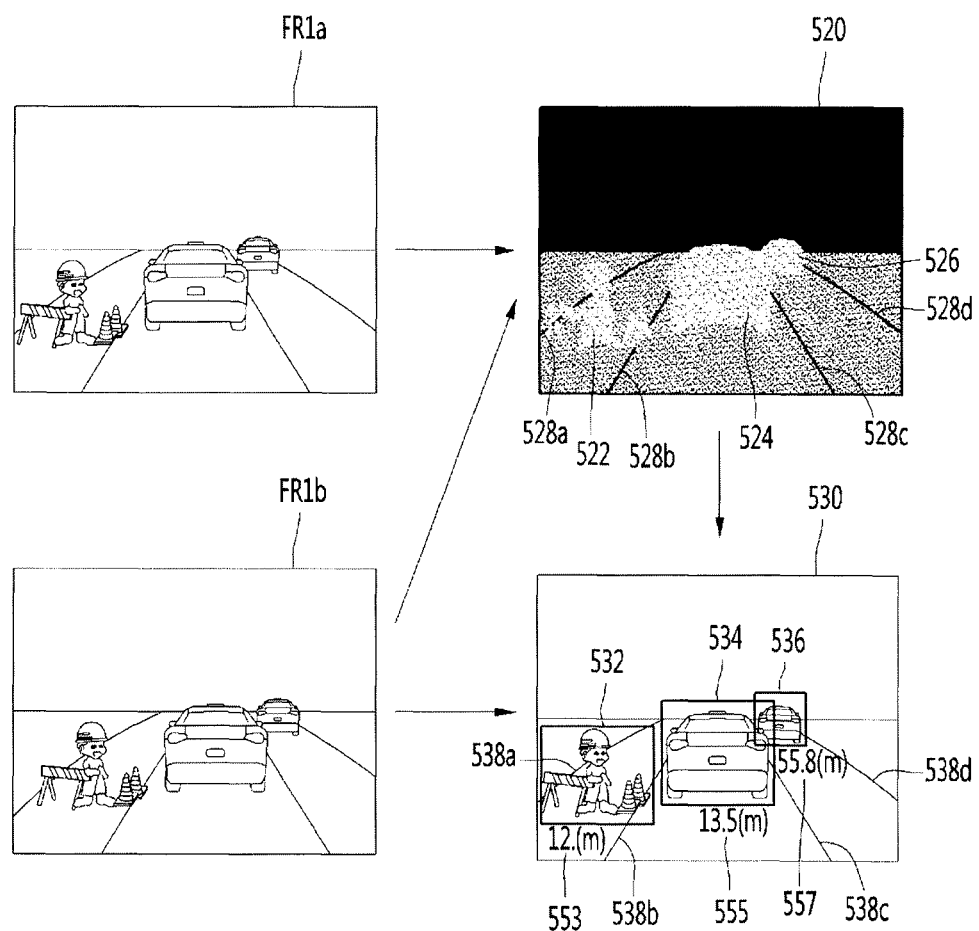

Referring to FIG. 6, during a first frame period, the camera 160 can acquire stereo images. The disparity calculator 420 of the processor 160 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase. When such a disparity map is displayed, luminance may increase as the disparity level increases and decrease as the disparity level decreases.

In FIG. 6, disparity levels respectively corresponding to first to fourth lanes 528a, 528b, 528c and 528d, and disparity levels respectively corresponding to a construction area 522, a first preceding vehicle 524 and a second preceding vehicle 526 are included in the disparity map 520. The segmentation unit 432, the object detector 434 and the object verification unit 436 can perform segmentation, object detection and object verification with respect to at least one of the stereo images FR1a and FR1b based on the disparity map 520.

In FIG. 6, object detection and verification are performed with respect to the second stereo image FR1b using the disparity map 520. That is, object detection and verification are performed with respect to the first to fourth lanes 538a, 538b, 538c and 538d, the construction area 532, the first preceding vehicle 534 and the second preceding vehicle 536 of the image 530. With image processing, the parking assistance apparatus 100 can acquire various surrounding information of the vehicle, such as peripheral objects, the positions of the peripheral objects or distances to the peripheral objects (553, 555 and 557), using the sensor unit 155, as sensor information.

In addition, the parking assistance apparatus 100 can further include a display unit 180 for displaying a graphic image of the parking assistance function. In an embodiment, the display unit 180 can display a vehicle surrounding image photographed by the camera 160 and further display a candidate parking space on an image of the vehicle surrounding area with a graphic image.

Specifically, the display unit 180 can display an around view image and further display a graphic image in which a candidate parking space is highlighted in the around view image. In particular, the display unit 180 can display one or more virtual parking lines on a space that does not have existing parking lines (e.g., no painted lines on the ground) in the around view image and display a graphic image in which the candidate parking space defined by the virtual parking line is highlighted. Thus, the display unit 180 can display an augmented reality view of the driver's surrounding environment. Accordingly to an embodiment, when an input of selecting the candidate parking space defined by the virtual parking line is received, the processor 180 can set the selected candidate parking space as a target parking space and control the vehicle to move to the target parking space.

Figure 7:
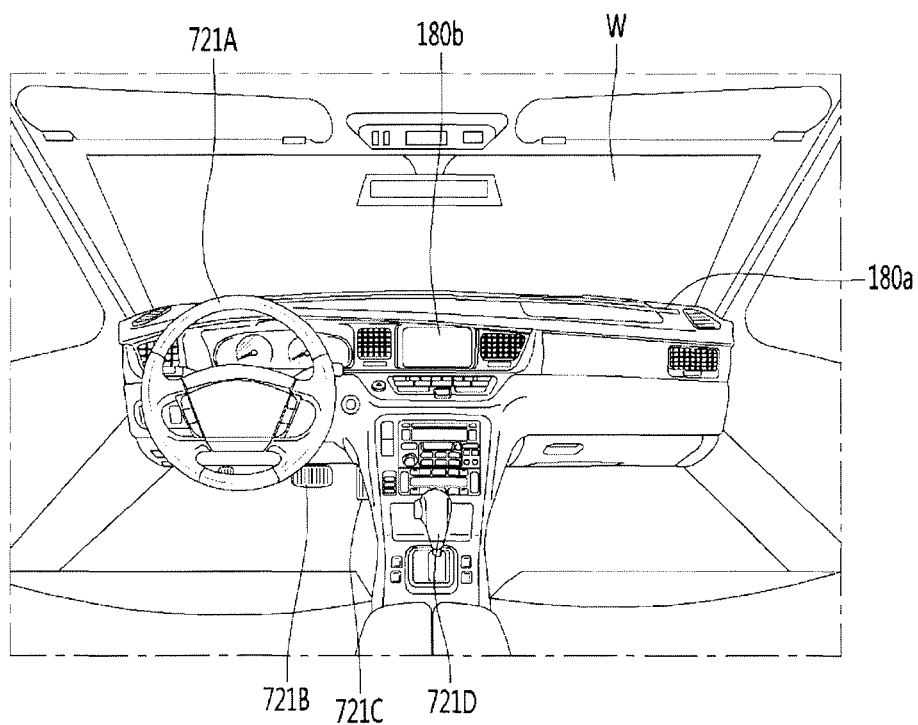
FIG. 7 is a diagram showing the inside of a vehicle having a parking assistance apparatus according to an embodiment of the present invention.

The display unit 180 may include a plurality of displays. With reference to FIG. 7, the display unit 180 can include a first display 180*a* for projecting and displaying a graphic image on a vehicle windshield W. That is, the first display 180*a* is a head up display (HUD) and can include a projection module for projecting the graphic image onto the windshield W. The graphic image projected by the projection module may have a predetermined transparency. Accordingly, a user may simultaneously view the front and rear sides of the graphic image (e.g., see through the graphic image). The graphic image cam overlap the image projected onto the windshield W to achieve augmented reality (AR).

The display unit can include a second display 180*b* separately provided inside the vehicle to display an image of the parking assistance function. In more detail, the second display 180*b* can be a display of a vehicle navigation apparatus or a cluster located at an internal front side of the vehicle.

The second display 180*b* can include at least one selected from among a Liquid Crystal Display (LCD), a Thin Film Transistor LCD (TFT LCD), an Organic Light Emitting Diode (OLED), a flexible display, a 3D display, and an e-ink display. The second display 180*b* can be combined with a touch input unit to achieve a touchscreen.

In addition, the audio output unit 185 can audibly output a message illustrating the function of the parking assistance apparatus 100 and checking whether or how the parking assistance function is performed. That is, the parking assistance apparatus 100 can provide an explanation of the function of the parking assistance apparatus 100 via visual display of the display unit 180 and audio output of the audio output unit 185.

Also, the haptic output unit can output an alarm for the parking assistance function in a haptic manner. For example, the parking assistance apparatus 100 can output vibration to the user when a warning is included in at least one of navigation information, traffic information, communication information, vehicle state information, advanced driver assistance system (ADAS) function and other driver convenience information.

The haptic output unit can provide directional vibration. For example, the haptic output unit can be provided in a steering apparatus for controlling steering to output the vibration. Left or right vibration can be output according to the left and right sides of the steering apparatus to enable directional haptic output.

In addition, the power supply 190 can receive power and supply power for operation of the components under control of the processor 170. Further, the parking assistance apparatus 100 can include the processor 170 for controlling overall operation of the units of the parking assistance apparatus 100.

In addition, the processor 170 can control at least some of the components described with reference to FIG. 3 in order to execute the application program. Further, the processor 170 can operate by combining at least two of the components included in the parking assistance apparatus 100, in order to execute the application program.

The processor 170 can be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions. Also, the processor 170 can be controlled by the controller or may control various functions of the vehicle through the controller.

The processor 170 can control the overall operation of the parking assistance apparatus 100 in addition to operations related to the application programs stored in the memory 140. The processor 170 can process signals, data, information, etc. via the above-described components or execute the application programs stored in the memory 170 to provide appropriate information or functions to the user.

Figure 8:
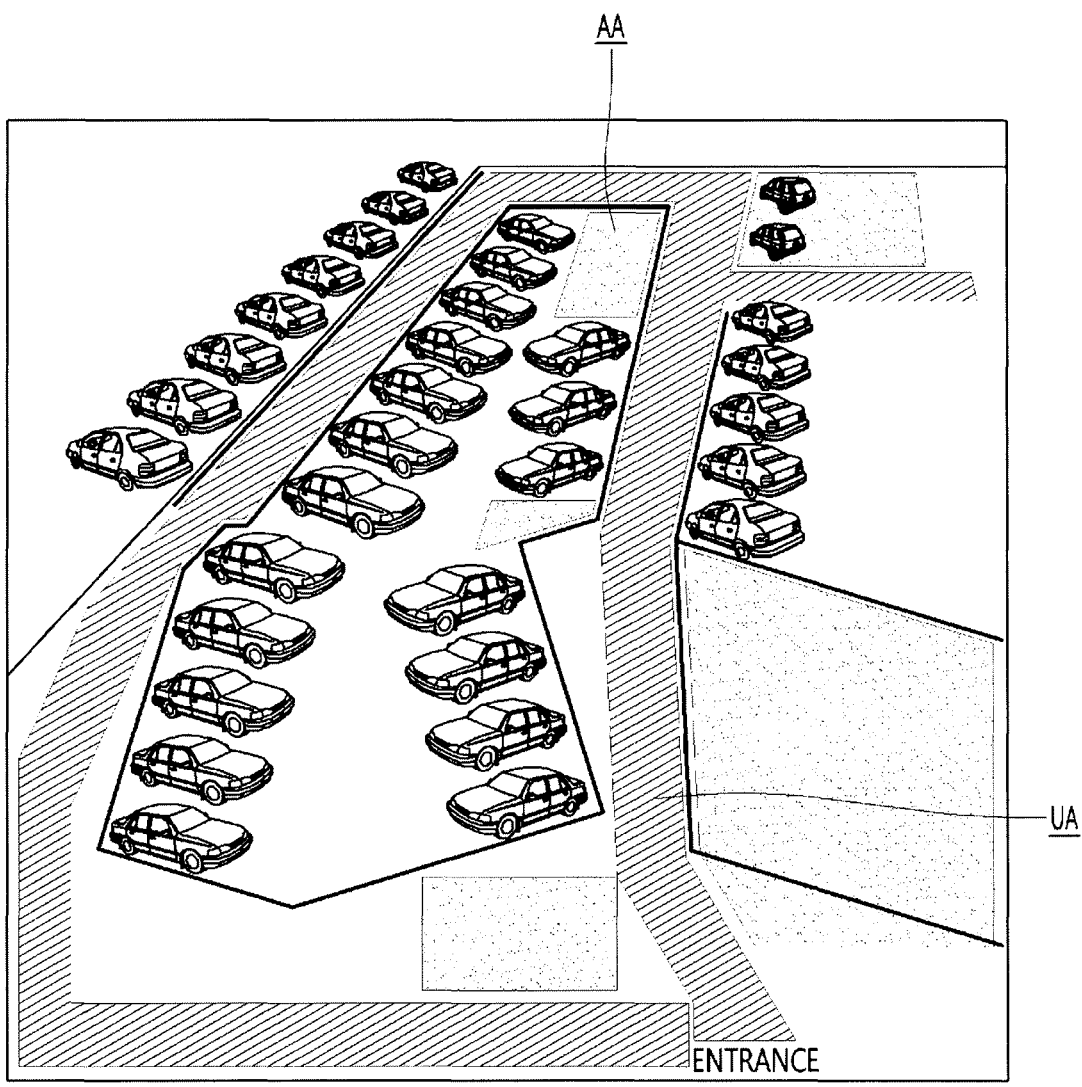
FIG. 8 is an example of a plurality of vehicles are parked in a parking lot having no parking lines.

Referring to FIG. 8, a plurality of other vehicles may be parked with various parking patterns in a parking lot that has no existing parking lines. The parking lot can be divided into a parking area AA on which parking is allowable, and a no parking area UA on which parking is not allowable, such as a driving corridor or an area around an entrance or exit. When the parking assistance apparatus 100 generates virtual parking lines based on only the parking pattern of other vehicles without considering the no parking area, there may occur a problem that the passage of another vehicle or another person is obstructed.

In an embodiment, the parking assistance apparatus 100 can divide the parking lot into the parking area AA and the no parking area UA, generate one or more virtual parking lines suitable for surrounding environments in the parking area AA, and search for a suitable parking space. A process of providing the virtual parking line-based automatic parking function by controlling elements of the parking assistance apparatus 100 described above will be described in detail below.

Figure 9:
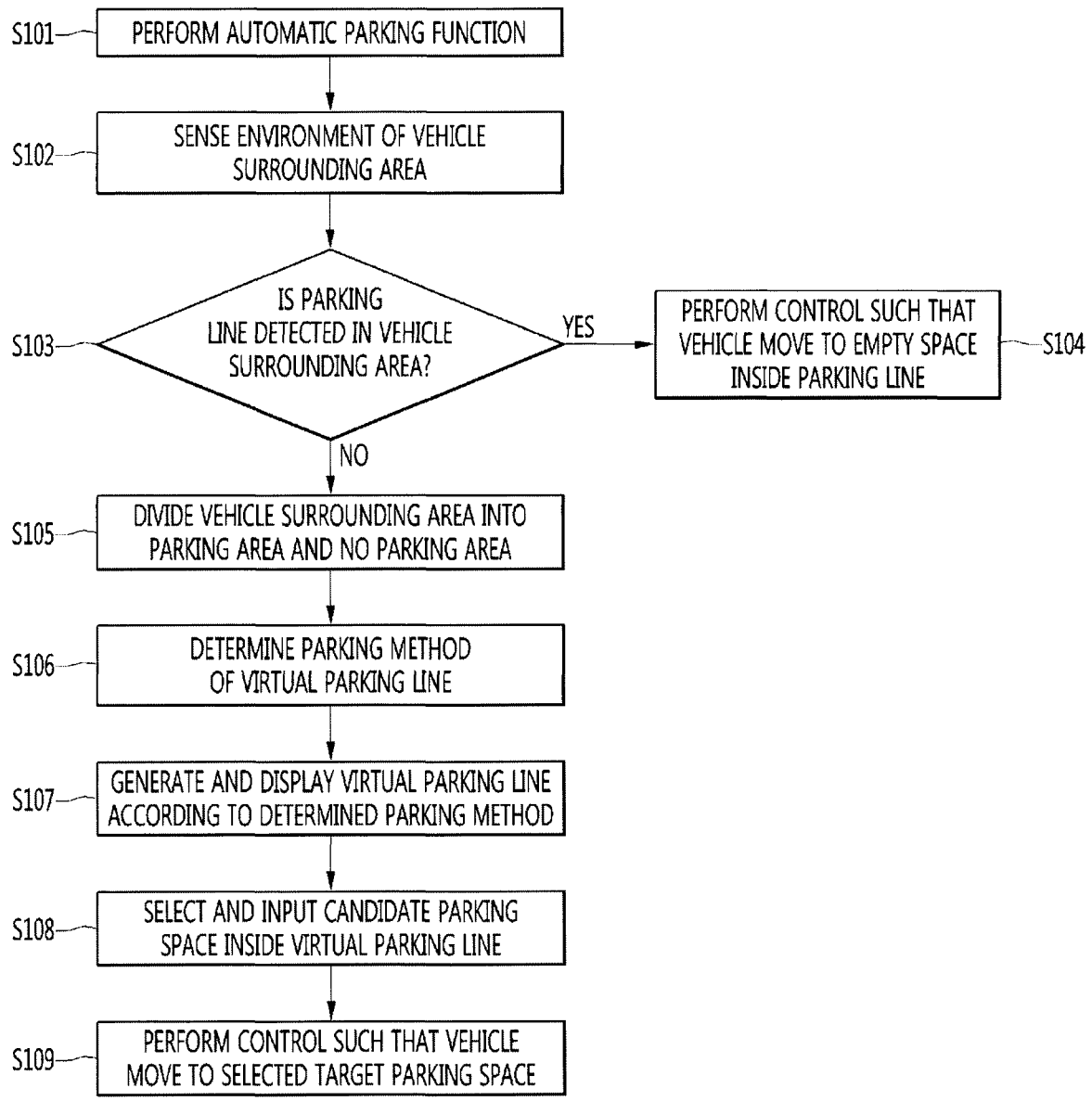
FIG. 9 is a flowchart of a process of providing a virtual parking lines-based automatic parking function in a parking lot without parking lines according to an embodiment of the present invention.

Referring to FIG. 9, performance of an automatic parking function can be selected by a user (S101). Specifically, when the input unit 110 detects an input for performing the automatic parking function from the user, the processor 170 can perform the automatic parking function.

When the automatic parking function is performed, the processor 170 can detect environments of a vehicle surrounding area through the sensor unit 155 (S102). Specifically, the camera can acquire a vehicle surrounding image by photographing the vehicle surrounding area, and the processor 170 can acquire information on objects of the vehicle surrounding image by performing image processing on the vehicle surrounding image and acquire environment information of the vehicle surrounding area. Also, the processor 170 can generate a 3-dimensional (3D) map for the objects of the vehicle surrounding image as data by combining street information acquired through a street sensor with the vehicle surrounding image and acquire the environment information of the vehicle surrounding area.

The environment information of the vehicle surrounding area can include information about various objects located in the vehicle surrounding area, such as curb stones, street trees, lanes, parking signs, parking lines, other vehicles and pedestrians. The environment information of the vehicle surrounding area can further include information about a boundary line of a parking lot, a parking pattern of another vehicle, parking lines, lanes, a parking guide sign, a traveling path of a vehicle, a movement direction of a host vehicle and a traveling pattern of another vehicle, which are detected by analyzing the above-described objects.

Based on the environment information of the vehicle surrounding area, the processor 170 can determine whether there is an existing parking line(s) in the vehicle surrounding area (S103).

When there are existing parking lines (e.g., parking lines painted on the ground), the processor 170 can detect an empty parking space defined by the parking lines, set candidate parking spaces, determine one of the candidate parking spaces as a target parking space and control the vehicle to move to the target parking space (S104).

When there are no existing parking lines (e.g., no lines or marking on the ground), the processor 170 can search for a parking space based on virtual parking lines. However, when the virtual parking lines are thoughtlessly generated in the vehicle surrounding area, a parking space defined by the virtual parking lines may be located on the driving corridor or other area with parking is not allowed or not preferable.

In order to prevent the above problem, the processor 170 can divide a parking lot or other area into a no parking area UA on which parking is not allowable and a parking area AA on which parking is allowable in the vehicle surrounding area (S105). Further, the processor 170 can set the parking area AA for allowable parking and generate the virtual parking lines only in the parking area AA. In this instance, it can also consider an area in which the virtual parking lines are not drawn, as the no parking area UA.

Further, the processor 170 can set the no parking area UA on which parking is not allowed and generate the virtual parking lines only outside the no parking area UA. In this instance, an area in which the virtual parking lines are drawn can be considered as the parking area AA.

In an embodiment, the processor 170 can divide the vehicle surrounding area into the parking area AA and the no parking area UA based on the environment information of the vehicle surrounding area. The invention is not limited to this, and the processor can determine either only the parking area AA or only the no parking area UA.

Figure 10:
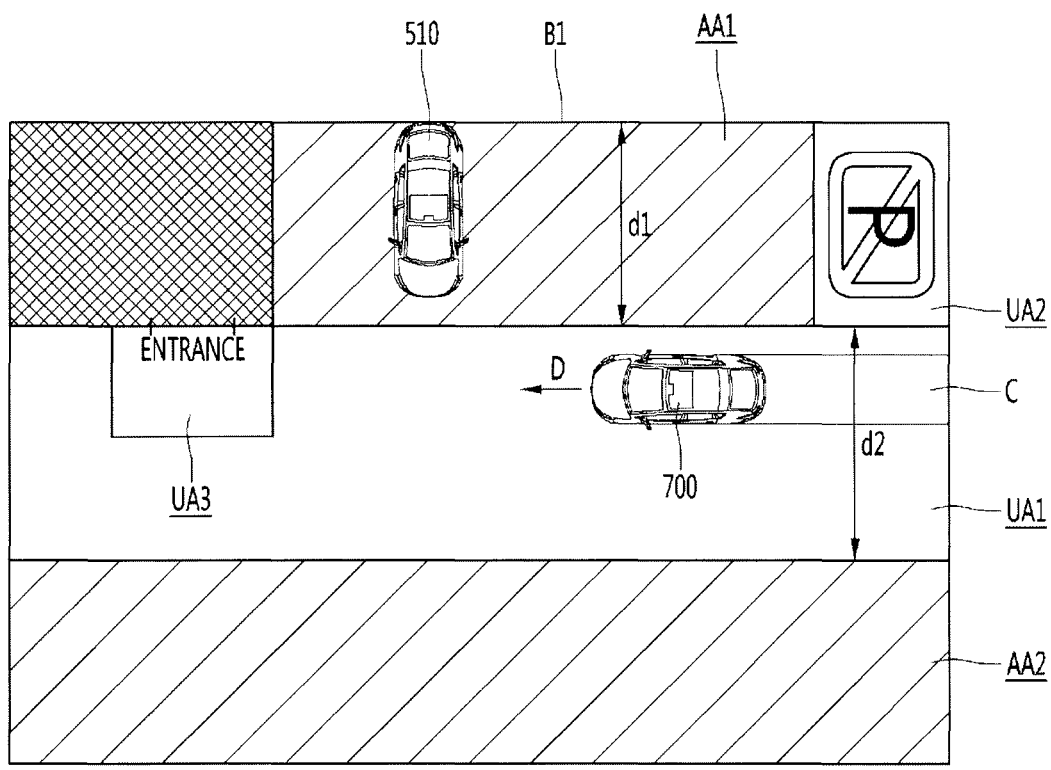
FIG. 10 is a diagram illustrating a vehicle surrounding area in which a parking area and a no parking area are defined according to an embodiment of the present invention.

In addition, the processor 170 can set at least one of a driving corridor area, a parking lot entrance surrounding area, a building entrance surround area, a pedestrian corridor area, and a no parking sign designation area, as the no parking area UA. For example, referring to FIG. 10, in the vehicle surrounding area, an area from a parking lot boundary B1 to a first predetermined distance d1 can be set as a first parking area AA1, and an area from the first parking area AA1 to a second predetermined distance d2 can be set as a first no parking area UA1. Also, in the vehicle surrounding area, an area designated by a no parking sign can be set as a second no parking area UA2 and the area surrounding the building entrance can be set as a third no parking area UA3.

As described above, there can be various no parking areas UA, but at least one no parking area UA can include a driving corridor area, and the driving corridor area can be determined based on the environment information of the vehicle surrounding area and the parking area AA. Specifically, the processor 170 can determine the parking area AA based on the movement direction D of the host vehicle, the boundaries of the parking lot B1, or/and another vehicle 510 in the vehicle surrounding area. Also, the processor 170 can determine or identify the driving corridor area based on the parking area AA, the movement direction D and the movement path of the host vehicle, the parking lot boundary B1, or/and another vehicle 510 in the vehicle surrounding area, and set the driving corridor area as a no parking area UA.

In addition, the processor 170 can determine a parking method for generating virtual parking lines in the parking area AA (S106). Specifically, the processor 170 can determine one of a right angle parking method, a parallel parking method, and a diagonal parking method, as a parking method for generating the virtual parking lines, based on the size of the parking area AA, the parking pattern of one or more other vehicles 510, or the like. Further, the processor 170 can generate virtual parking lines in the parking area AA according to the determined parking method and control the display unit 180 to display the virtual parking lines along with the vehicle surrounding area (S107).

Next, the processor 170 can set one of the generated candidate parking spaces defined by the virtual parking line as a target parking space and control the vehicle to move to the target parking space, thus performing the virtual parking line-based automatic parking function (S108 and S109). Specifically, the processor 170 can detect an empty parking space defined by the virtual parking lines, determine the empty parking space as a candidate parking space and control the display unit 180 to display the candidate parking space.

The processor 170 can receive an input selecting one of the candidate parking spaces from the user through the input unit 110 and set the selected candidate parking space as a target parking space. Subsequently, the processor 170 designs a parking path for directing the vehicle from a current position to the target parking space and controls the vehicle to follow the parking path by controlling the steering, engine power, braking, or the like of the vehicle, thus performing automatic parking.

There are examples in which the vehicle surrounding area is divided into the parking area AA and the no parking area UA and virtual parking lines are generated in the parking area. First, an example of generating the virtual parking lines in a parking lot where no other vehicles are parked and searching for a parking space will be described with reference to FIGS. 11A and 11B.

Figure 11A:
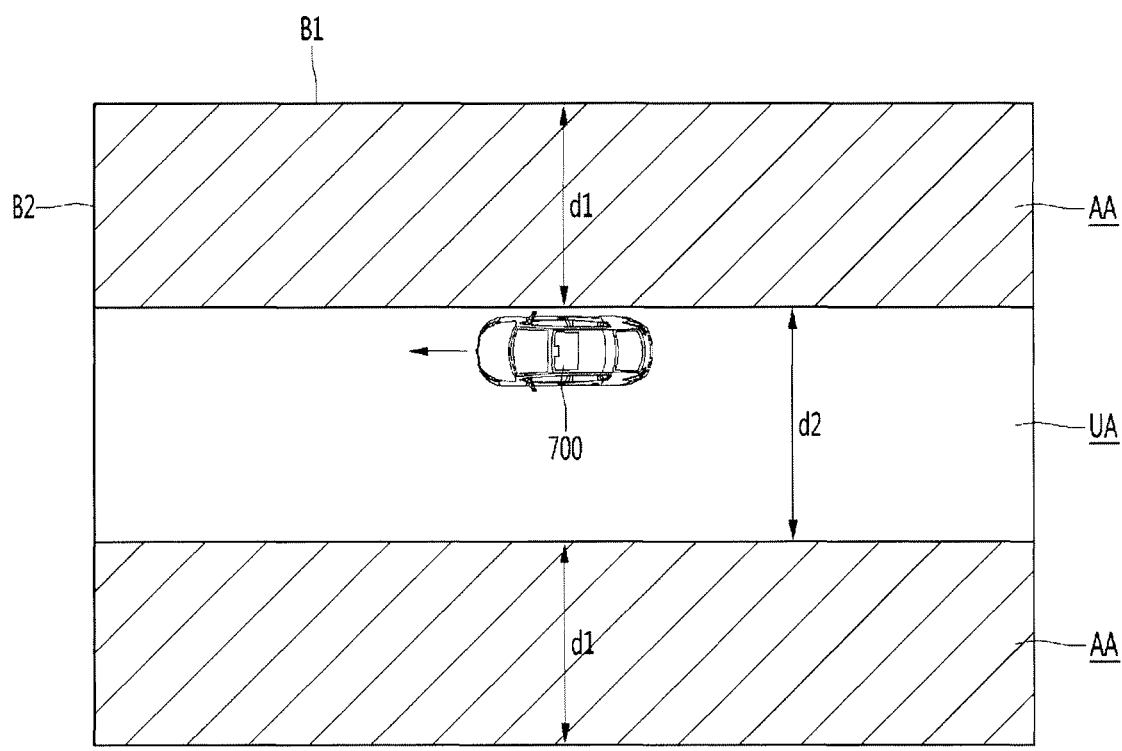
FIG. 11A is a diagram illustrating a vehicle surrounding area that is divided into a parking area and a no parking area according to an embodiment.

Referring to FIG. 11A, the processor 170 can detect boundary lines of the vehicle surrounding area based on curb stones, street trees, parking lines, or the like. Specifically, the processor 170 can detect a first boundary line B1 of a vehicle surrounding area located in a lateral direction of the vehicle and detect a second boundary line B2 of a vehicle surrounding area located in a direction, in which the vehicle is heading.

The processor 170 can determine an area from the first boundary line B1 of the vehicle surrounding area to a first predetermined distance d1 in the lateral direction of the vehicle as a parking area AA, and determine an area from a boundary line of the parking area AA to a second predetermined distance d2 as a driving corridor area UA. An area other than the driving corridor area UA may be again determined as the parking area AA. The first determined distance d1 can have a length sufficient for the vehicle to perform right angle parking.

Specifically, when the first boundary line B1 is detected in the lateral direction of the vehicle, the processor 170 can detect a boundary line of the parking area AA based on the first boundary line B1 and set an area between the boundary line of the parking area AA and the first boundary line B1 as the parking area AA. That is, the processor 170 can allow the vehicle to be parked in alignment with the boundary line by setting the parking area AA based on the movement direction D of the vehicle and the boundary line B1 of the vehicle surrounding area, thus efficiently using the space of the vehicle surrounding area. Also, the processor 170 can set the parking area AA after securing the driving corridor area UA, and search for a parking space which does not obstruct the passage of other vehicles 510.

When there is no boundary line, the processor 170 may determine an area to the first predetermined distance d1 in the lateral direction of the vehicle as a parking area AA and determine an area from a boundary line of the parking area AA to a second predetermined distance d2 as a driving corridor area. The processor 170 can generate virtual parking lines in the determined parking area AA. Specifically, the processor 170 cam determine a parking method depending on a size of the parking area AA and generate virtual parking lines according to the determined parking method for alignment with the boundary line.

Figure 11B:
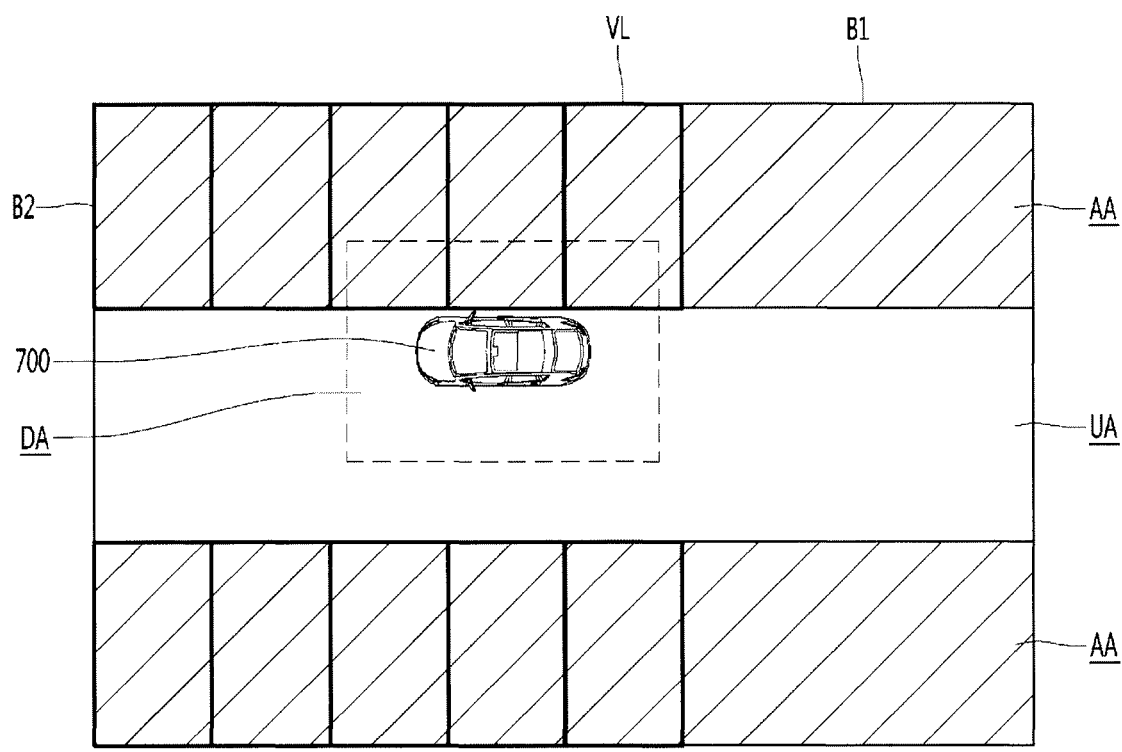
FIG. 11B is a diagram illustrating a situation where virtual parking lines are generated in the parking area resulting from the division in FIG. 11A.

Referring to FIG. 11B, when a length of the parking area AA is sufficient for the right angle parking method in the lateral direction of the vehicle, virtual parking lines VL for the right angle parking method can be generated. That is, since the parking area AA has a size determined based on the first distance d1 for the right angle parking method, the virtual parking lined VL according to the right angle parking method can be generated in the parking area AA.

In this instance, a virtual parking line VL (or a portion thereof) according to the right angle parking method can be aligned with the first boundary line B1 of the vehicle surrounding area. Also, another virtual parking line VL (or portion) can be aligned with the second boundary line B2 of the vehicle surrounding area and therefore, the virtual parking lines VL can be generated to efficiently use the space of the vehicle surrounding area.

That is, the processor 170 can set the parking area AA based on the boundary line B1 in the parking lot in which no other vehicle 510 is present, generate the virtual parking lines VL according to the size of the parking area AA, and determine a parking space, in a manner that efficiently uses the area of the parking lot.

Further, a display area DA illustrated in FIG. 11B can include an image showing a portion of the generated virtual parking lines VL and the vehicle surrounding area displayed on the display unit 180. Thereafter, when the user sets a target parking space by touching a candidate parking space defined by the virtual parking lines VL, the parking assistance apparatus 100 can control the vehicle to move to the target parking space, thus completing automatic parking.

Figure 12A:
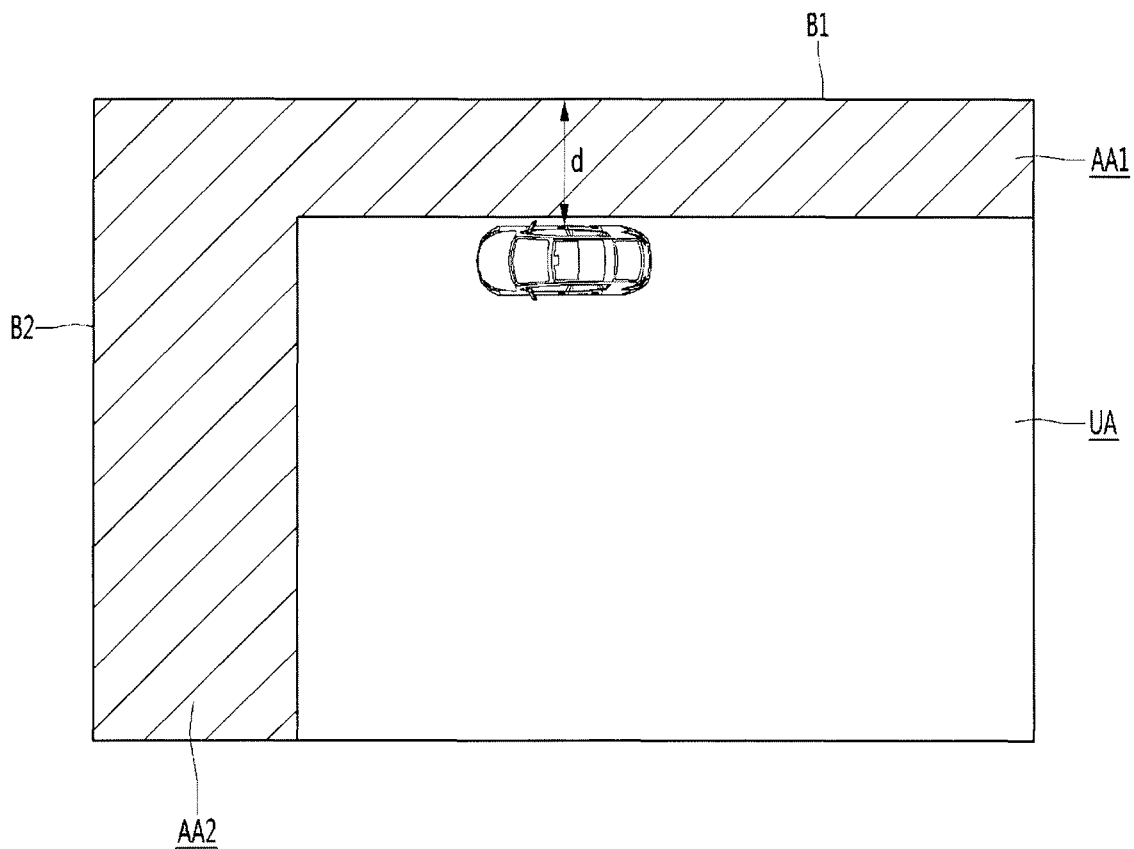
FIG. 12A illustrates a case where a vehicle surrounding area is divided into a parking area and a no parking area according to another embodiment.

Another example of generating virtual parking lines in a parking lot where another vehicle is absent and searching for a parking space will be described with reference to FIGS. 12A and 12B. Referring to FIG. 12A, the processor 170 can detect a boundary line of the vehicle surrounding area based on curb stones, street trees, parking lines, or the like. Specifically, the processor 170 may detect a first boundary line B1 of a vehicle surrounding area located in a lateral direction of the vehicle and detect a second boundary line B2 of a vehicle surrounding area located in a front direction of the vehicle.

The processor 170 can determine an area extending from the first boundary line B1 of the vehicle surrounding area to a first predetermined distance d1 as a parking area AA and determine an area from a boundary line of the parking area AA to a second predetermined distance d2 as a driving corridor area UA. In this instance, the predetermined distance can be changed according to a distance between the vehicle and the boundary lines of the vehicle surrounding area.

For example, when the distance between the first boundary line B1 of the vehicle surrounding area and the vehicle is short, the first parking area AA1 with a size sufficient to generate virtual parking lines VL according to a parallel parking method may be set. When the distance between the second boundary line B2 of the vehicle surrounding area and the vehicle is sufficient to perform right angle parking, the second parking area AA2 having a size sufficient to generate virtual parking lines VL according to right angle parking method may be set. That is, the processor 170 can allow the vehicle to be parked so that it is aligned with the boundary line by setting the parking area AA based on the boundary line of the vehicle surrounding area, thus making efficient use of the space of the vehicle surrounding area.

The processor 170 can generate virtual parking lines VL in the determined parking area AA. Specifically, the processor 170 can determine a parking method based on a size of the parking area AA (or distance between the vehicle and the boundary line of the vehicle surrounding area) and generate virtual parking lines VL according to the determined parking method for alignment with the boundary line.

Figure 12B:
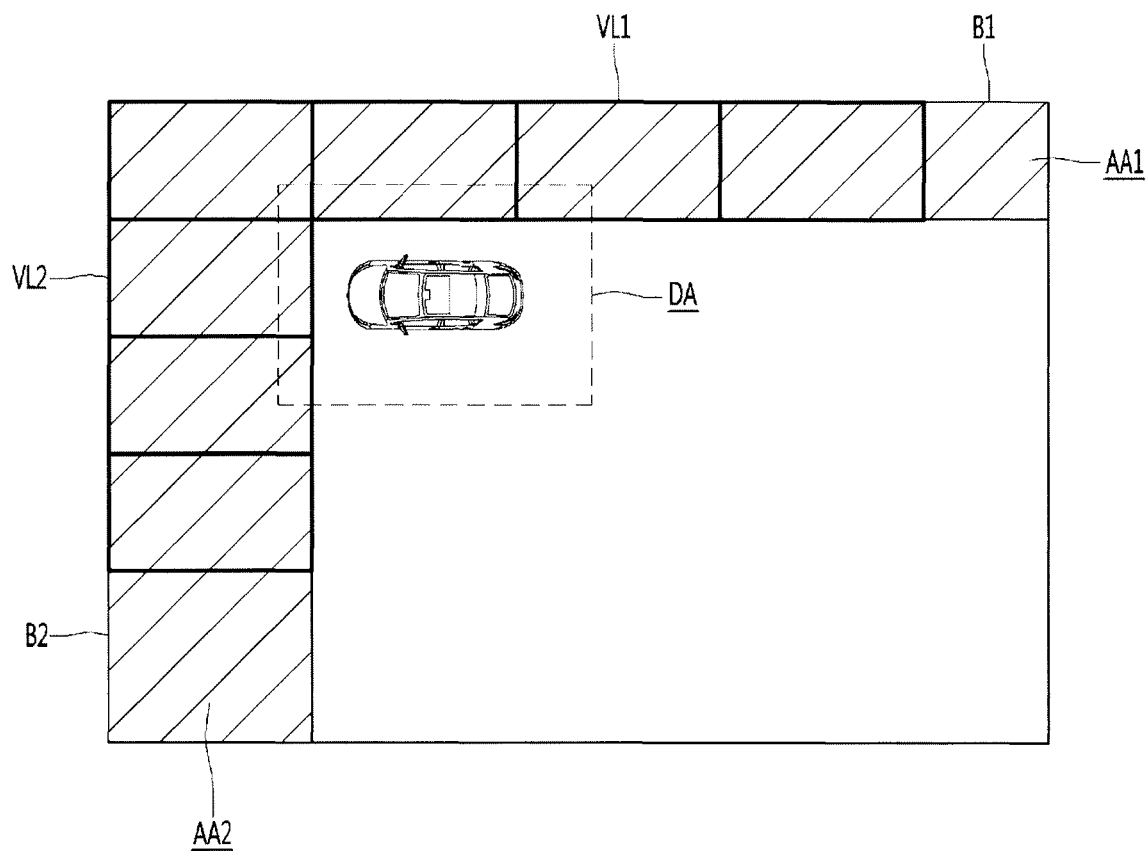
FIG. 12B illustrates a situation where virtual parking lines are generated in the parking area resulting from the division in FIG. 12A.

Referring to FIG. 12B, a lateral length of the first parking area AA1 in the lateral direction of the vehicle is matched to the virtual parking lines VL1 according to the parallel parking method and therefore, the first virtual parking lines VL1 according to the parallel parking method can be generated in the first parking area AA1. A front length of the second parking area AA2 in the front direction of the vehicle is matched to the virtual parking lines VL2 according to the right angle parking method and therefore, the second virtual parking lines VL2 for right angle parking can be generated in the second parking area AA2.

A display area DA illustrated in FIG. 12B can include an image showing a portion of the generated virtual parking lines VL1 and VL2, and the vehicle surrounding area on the display unit 180. Thereafter, when the user sets a target parking space by touching a candidate parking space defined by the virtual parking lines VL1 and VL2, the parking assistance apparatus 100 can control the vehicle to move to the target parking space, thus completing automatic parking.

As described above, the parking assistance apparatus 100 according to the embodiment can generate virtual parking lines VL, in a manner that efficiently utilizes the vehicle surrounding area based on a boundary line, even when the vehicle surrounding area has no existing parking lines and provides the virtual parking line (VL)-based automatic parking function, thus enhancing user convenience.

An example of generating virtual parking lines VL in a parking lot where another vehicle 510 is present, and searching for a parking space will be described with reference to FIGS. 13A and 13B. When another vehicle 510 parked in the vehicle surrounding area is detected, the processor 170 extracts a boundary surface 510L of the another vehicle 510 based on a vehicle movement direction D and a parking pattern of the parked vehicle 510, determines an area inside the boundary line BL as a parking area AA based on the boundary line BL extending from the boundary surface 510L of the parked vehicle 510, and determines an area extending a predetermined distance away from the boundary line BL as the driving corridor area UA. An area outside the driving corridor area UA can be determined as the parking area AA.

Figure 13A:
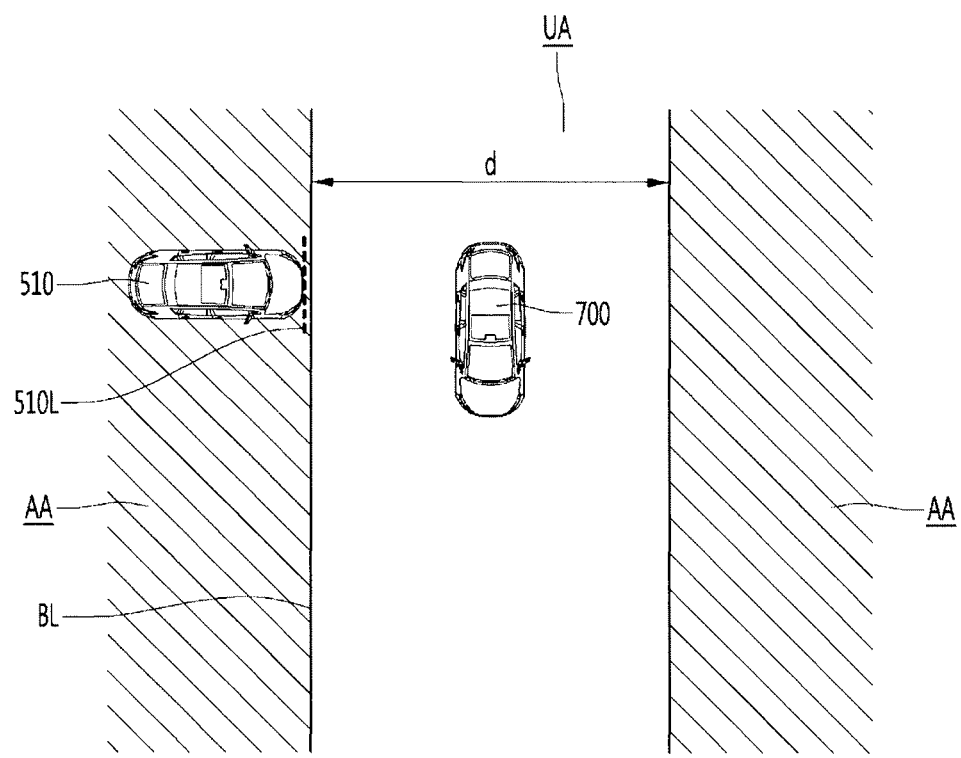
FIG. 13A illustrates a vehicle surrounding area that is divided into a parking area and a no parking area based on another vehicle parked therein, according to an embodiment.

Specifically, referring to FIG. 13A, when the another vehicle 510 is located in a lateral direction of a host vehicle 700, the boundary surface 510L of the parked vehicle 510 closest to the host vehicle is detected and the boundary line BL of the parking area AA may be set so that the boundary surface 510L of the another vehicle 510 is extended along a length direction (or along the vehicle movement direction D). The area inside the boundary line BL of the parking area AA is determined as the parking area AA and the area extending out to the predetermined distance outside the boundary line BL can be set as the driving corridor area. An area outside the driving corridor area UA can be determined as the parking area AA.

That is, the processor 170 can set the parking area AA on both sides of the host vehicle while securing the driving corridor area UA. Then, the processor 170 can determine a parking method based on the relationship between the vehicle movement direction D and the parking direction of the parked vehicle 510, and generate the virtual parking lines VL according to the determined parking method to be aligned with the boundary line BL of the parking area AA. Specifically, the processor 170 can determine a parking method suitable for the parking pattern of the parked vehicle 510 and generate the virtual parking lines VL according to the determined parking method for alignment with the boundary line BL.

Figure 13B:
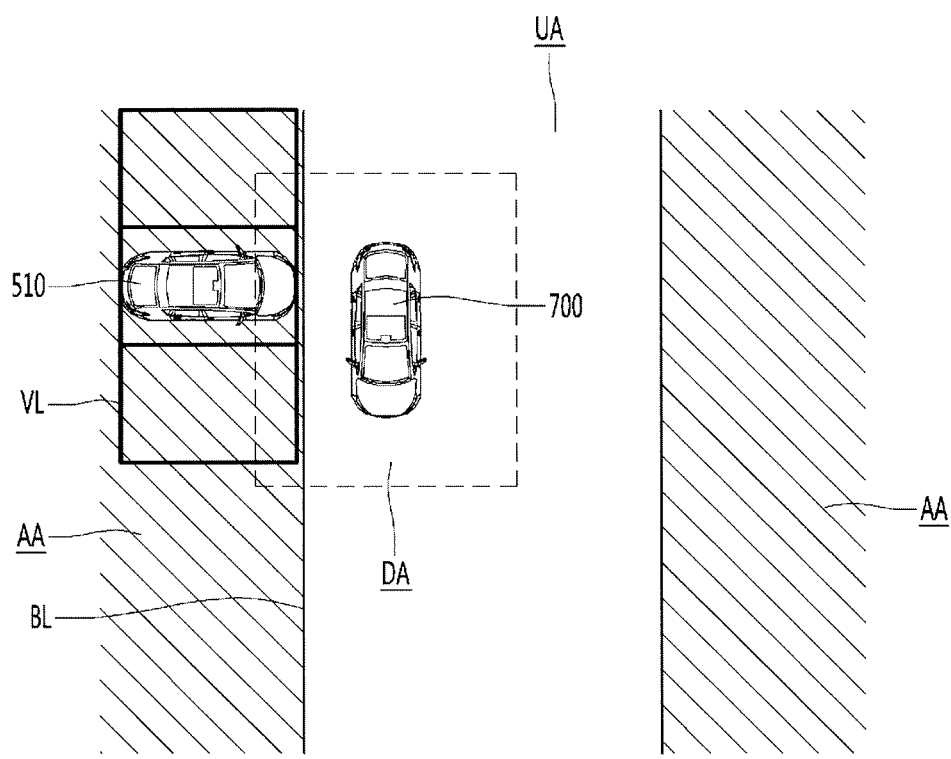
FIG. 13B illustrates a situation where virtual parking lines are generated in the parking area resulting from the division in FIG. 13A.

Referring to FIG. 13B, since the another vehicle 510 has been parked according to the right angle parking method based on the lateral direction of the host vehicle 700, virtual parking lines VL for the right angle parking method can be generated. Thereafter, virtual parking lines VL can be drawn based on the parking spot of the another vehicle 510 for the right angle parking method, in order to form a candidate parking space (e.g., spaces on the left or right of the parked car 510). That is, the processor 170 can detect the boundary surface 510L of the parked vehicle 510 based on the vehicle movement direction D of the host vehicle 700 in the parking lot in which the another vehicle 510 is present and generate the virtual parking lines VL according to the parking method of the parked vehicle 510 after the parking area AA is set based on the boundary surface 510L, thus allowing the vehicle 700 to be automatically parked in alignment with the parking pattern of the another vehicle 510.

Further, a display area DA illustrated in FIG. 13B can include an image showing a portion of the generated virtual parking lines VL and the vehicle surrounding area on the display unit 180 for viewing by the user. Thereafter, when the user sets a target parking space by touching a candidate parking space defined by the virtual parking lines VL, the parking assistance apparatus 100 can control the vehicle to drive into the target parking space, thus completing automatic parking.

In addition, an example of generating virtual parking lines VL in a parking lot where multiple vehicles 510 are already parked and searching for a parking space will be described with reference to FIGS. 14 to 17. When the other vehicles 510 parked in a line are detected in the vehicle surrounding area, the processor 170 can detect boundary surfaces 510L of the other vehicles 510 based on a vehicle movement direction D of the host vehicle 700 and determine a boundary line BL for a parking area AA based on the boundary surfaces 510L of the other vehicles 510. The processor 170 can set an area inside the determined boundary line BL as the parking area AA and determine an area up to a predetermined distance away from the boundary line BL as the driving corridor area. In addition, the processor 170 can again determine an area outside a driving corridor area UA as the parking area AA.

Figure 14:
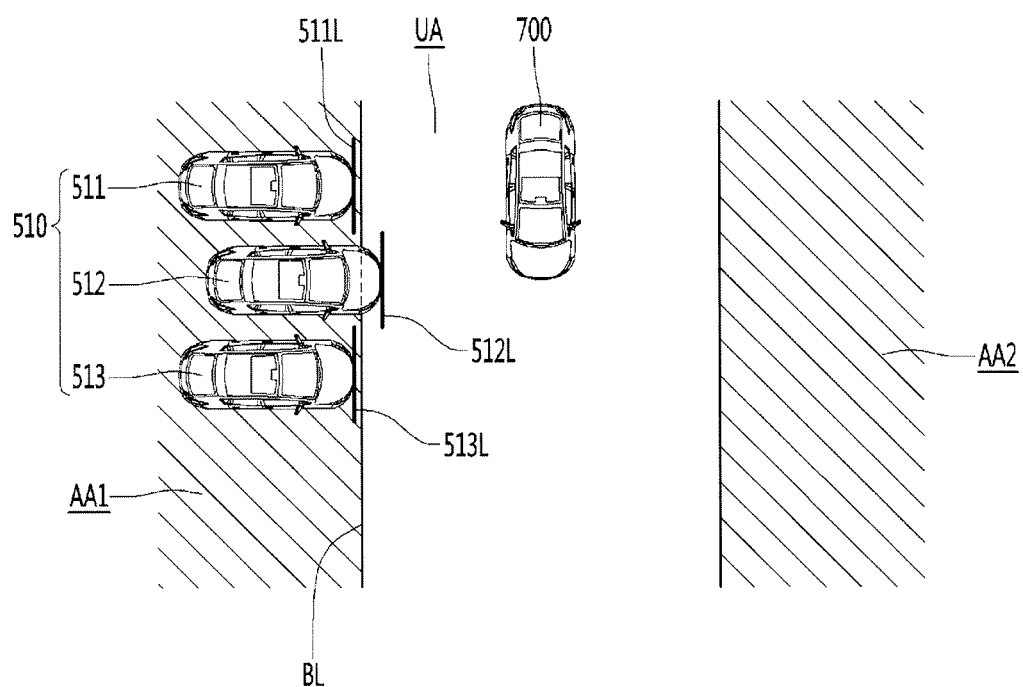
FIG. 14 is a diagram illustrating a parking area and a no parking area, which are distinguished from each other based on a plurality of other vehicles parked in a vehicle surrounding area according to an embodiment of the present invention.

Specifically, referring to FIG. 14, when the other vehicles 510 are parked in a line in the lateral direction of the host vehicle 700, the processor 170 can detect the boundary surfaces 511L, 512L, and 513L of the other vehicles 510 closest to the host vehicle 700 and calculate a boundary line BL for the parking area AA resulting from a calculation of the average of the boundary surfaces. Based on the boundary line BL of the parking area AA, an area on the side of the other vehicles 510 (hereinafter, referred to "inside") with respect to the boundary line BL is determined as a first parking area AA1 and an area extending a predetermined distance away from the side of the host vehicle 700 (hereinafter, referred to "outside") with respect to the boundary line BL is determined as a driving corridor area UA. In addition, the processor 170 may again determine an area outside a driving corridor area UA as a second parking area AA2.

That is, the processor 170 can set the parking areas AA1 and AA2 on both sides of the host vehicle 700 while securing enough room for the driving corridor area UA. Then, the processor 170 can determine a parking method according to relationship between the vehicle movement direction D of the host vehicle 700 and the parking direction of the other vehicles 510 and generate the virtual parking lines VL according to the determined parking method that are aligned with the boundary lines BL of the parking areas AA1 and AA2. Specifically, the processor 170 can determine a parking method suitable for the parking pattern of the other parked vehicles 510 in the first parking area AA1 and generate the virtual parking lines VL according to the determined parking method, which are aligned with the boundary line BL.

Figure 15A:
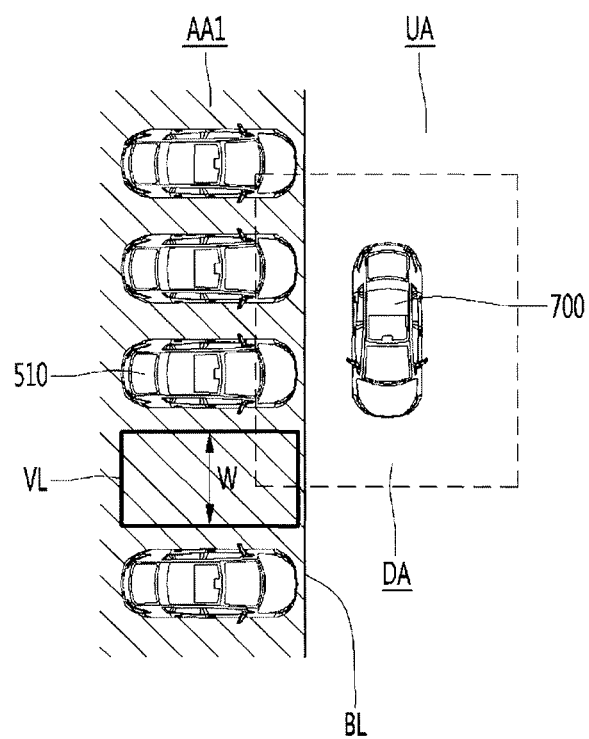
FIGS. 15A to 15C are diagrams illustrating situations in which virtual parking lines are generated in a parking area according to parking patterns of a plurality of other vehicles according to an embodiment of the present invention.

Referring to FIG. 15A, since the other vehicles 510 have been parked according to the right angle parking method based on the lateral direction of the vehicle 700, virtual parking lines VL for the right angle parking method can be generated to form a candidate parking space when a space between the other vehicles 510 is sufficient large enough for the right angle parking method.

Figure 15B:
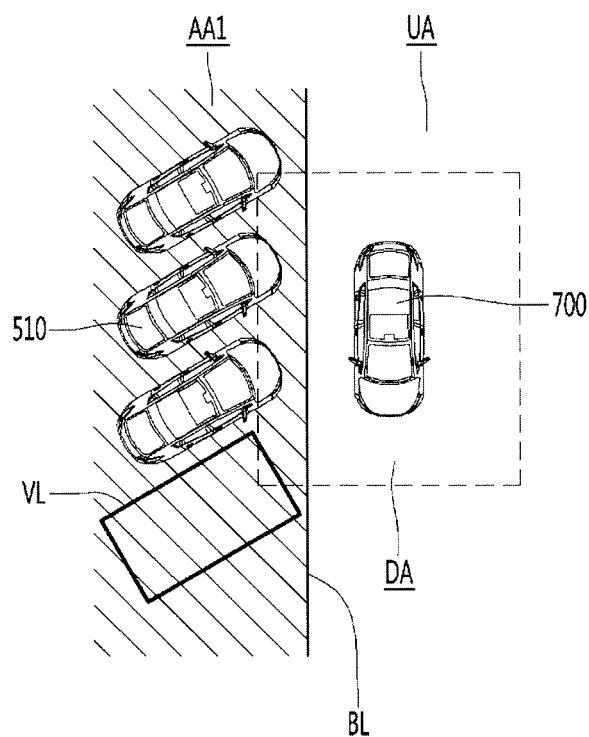

Referring to FIG. 15B, since the other vehicles 510 have been parked according to the diagonal parking method based on the lateral direction of the vehicle 700, when the parking area AA is located outside the another vehicle 510 located at the outermost position, virtual parking lines VL for the diagonal parking method can be generated to form a candidate parking space.

Figure 15C:
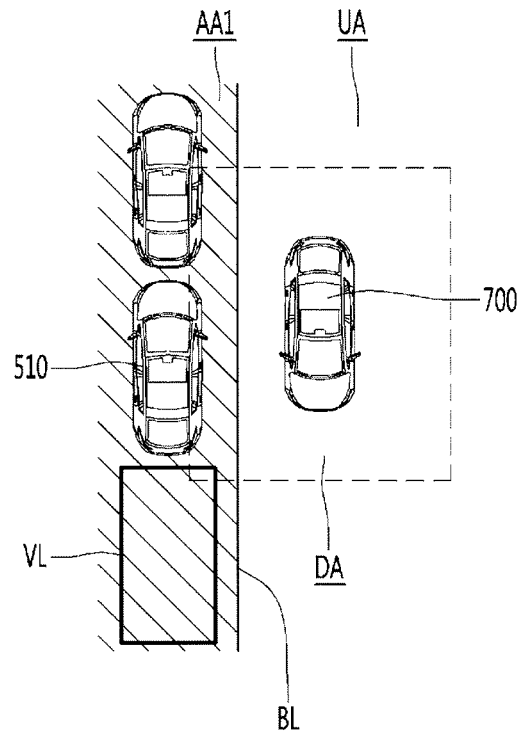

Referring to FIG. 15C, since the other vehicles 510 are parked according to the parallel parking method based on the lateral direction of the vehicle 700, when the parking area AA is located outside the another vehicle 510 located at the outermost position, virtual parking lines VL for the parallel parking method can be generated to form a candidate parking space. That is, the processor 170 cam detect the boundary surface 510L of the other vehicle 510 based on the vehicle movement direction D of the host vehicle 700 in the parking lot in which the another vehicle 510 is present and generate the virtual parking lines VL according to the parking method of the other vehicle 510, after the parking area AA is set based on the boundary surface 510L, thus allowing the vehicle to be automatically parked and aligned with the parking pattern of the other vehicle 510.

Further, a display area DA illustrated in FIGS. 15A to 15C can include an image showing a portion of the generated virtual parking lines VL and the vehicle surrounding area on the display unit 180 for viewing by the user. Thereafter, when the user sets a target parking space by touching a candidate parking space defined by the virtual parking lines VL, the parking assistance apparatus 100 can control the vehicle to be driven into the target parking space, thus completing automatic parking.

When there is not enough room for a parking space in the first parking area AA1 on the side of the other vehicles 510 parked in a line, the processor 170 can generate the virtual parking lines VL in the second parking area AA2 located on the opposite side of the first parking area AA1 based on the driving corridor area. Specifically, referring to FIG. 16, the processor 170 can set an area outside the driving corridor area UA as the second parking area AA2 and generate virtual parking lines VL in the second parking area AA2. In this instance, a parking method of the virtual parking lines VL generated in the second parking area AA2 can be determined based on the parking pattern of the other vehicles 510 parked in the first parking area AA1. Also, the processor 170 can determine the parking method of the virtual parking lines VL generated in the second parking area AA2 to fit the size of the second parking area AA2.

Figure 16:
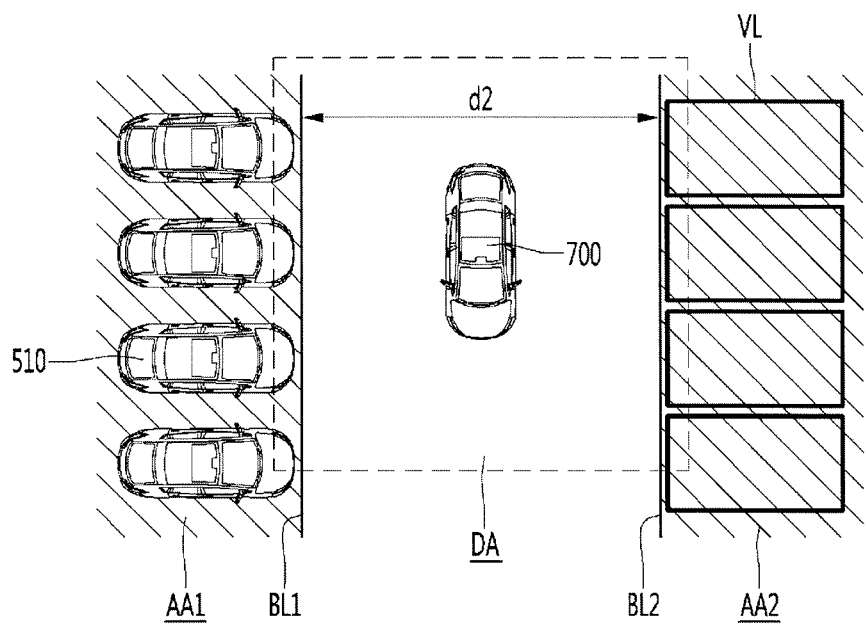
FIG. 16 is a diagram illustrating a situation in which virtual parking lines are generated in a parking area opposite to other parked vehicles according to an embodiment of the present invention.

The display area DA displayed in FIG. 16 is an area displayed on the display unit 180. When the user sets a target parking space by touching a candidate parking space defined by the virtual parking line VL, the parking assistance apparatus 100 can drive the vehicle into the target parking space, thus completing automatic parking in the area opposite to the other vehicles 510 while ensuring enough room for a driving corridor.

Figure 17:
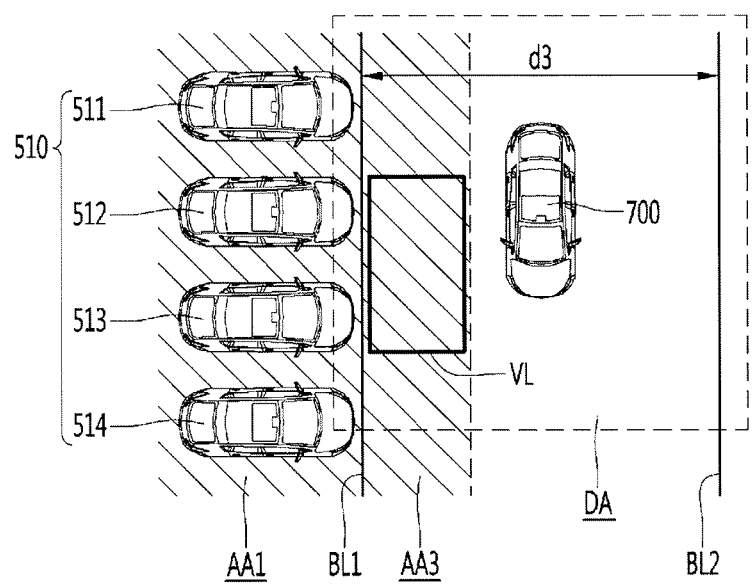
FIG. 17 is a diagram illustrating a situation in which a virtual parking line for double-parking is generated according to an embodiment of the present invention.

Further, with reference to FIG. 17, when an input for performing automatic double-parking or parallel parking is input from the input unit 110, the processor 170 can change part of the driving corridor area UA into the parking area AA and generate virtual parking lines VL in the parking area AA. Specifically, since a length between the boundary lines BL on both sides of the driving corridor is equal to or greater than a predetermined third length d3, when a double-parking request for the host vehicle has been made, the processor 170 can generate the virtual parking lines VL for double-parking if the passage of the another vehicle 150 is not obstructed.

Referring to FIG. 17, when a width of the driving corridor is equal to or greater than the third predetermined length d3, the processor 170 can generate virtual parking lines VL according to a parallel parking method in a portion of the driving corridor area UA on the side of the other vehicles 510. Specifically, when a width of the driving corridor is equal to or greater than the third predetermined length d3, the processor 170 can set a portion of the driving corridor area UA on the side of the other vehicles 510 as a third parking area AA and generate virtual parking lines VL according to a parallel parking method in a third parking area AA.

The display area DA displayed in FIG. 17 is an area displayed on the display unit 180. When the user sets a target parking space by touching a candidate parking space defined by the virtual parking lines VL for double-parking, the parking assistance apparatus 100 can control the vehicle to drive into the target parking space, thus achieving double-parking of the vehicle, while ensuring enough room for a driving corridor.

Next, another example of generating virtual parking lines VL in a parking lot where other vehicles 510 are present and searching for a parking space will be described with reference to FIGS. 18 to 21. When other vehicles 510 parked on the right and left sides of the host vehicle 700 are detected in the vehicle surrounding area, the processor 170 can extract boundary surfaces of the other vehicles 510 on the both sides in a vehicle movement direction D and extract boundary lines on the both sides of a driving corridor by calculating the average of the boundary surfaces.

Specifically, when detecting a parking pattern of a first row of other vehicles 510 arranged on one side and a parking pattern of a second row of other vehicles 520 arranged on the other side in the vehicle surrounding area, the processor 170 can generate a first boundary line BL1 of a first parking area AA1 based on the parking pattern of the first row of other vehicles 510 and generate a second boundary line BL2 of a second parking area AA2 based on the parking pattern of the second row of other vehicles 520. For example, the processor 170 can generate first virtual parking lines VL1 according to the parking method of the parking pattern of the first row of other vehicles 510 in the parking area AA inside the first boundary line B1 and generate second virtual parking lines VL2 according to the parking method of the parking pattern of the second row of other vehicles 520 in the parking area AA inside the second boundary line B2.

Figure 18:
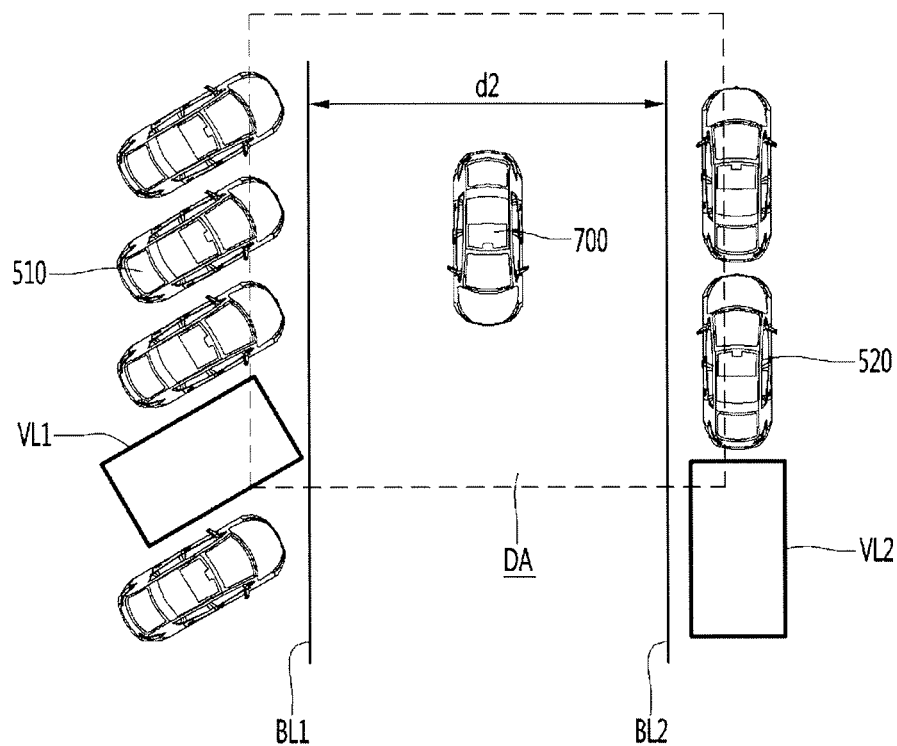
FIG. 18 is a diagram illustrating virtual parking lines that are generated when other vehicles are arranged in a plurality of rows according to an embodiment of the present invention.

Referring to FIG. 18, since the other vehicles 510 are parked according to the diagonal parking method in the first parking area AA1 located on the left side of the vehicle, virtual parking lines VL1 according to the diagonal parking method can be generated. Since the other vehicles 520 are parked according to a parallel parking method in the second parking area AA2 located on the right side of the vehicle, virtual parking lines VL2 according to the parallel parking method can be generated.

Figure 19:
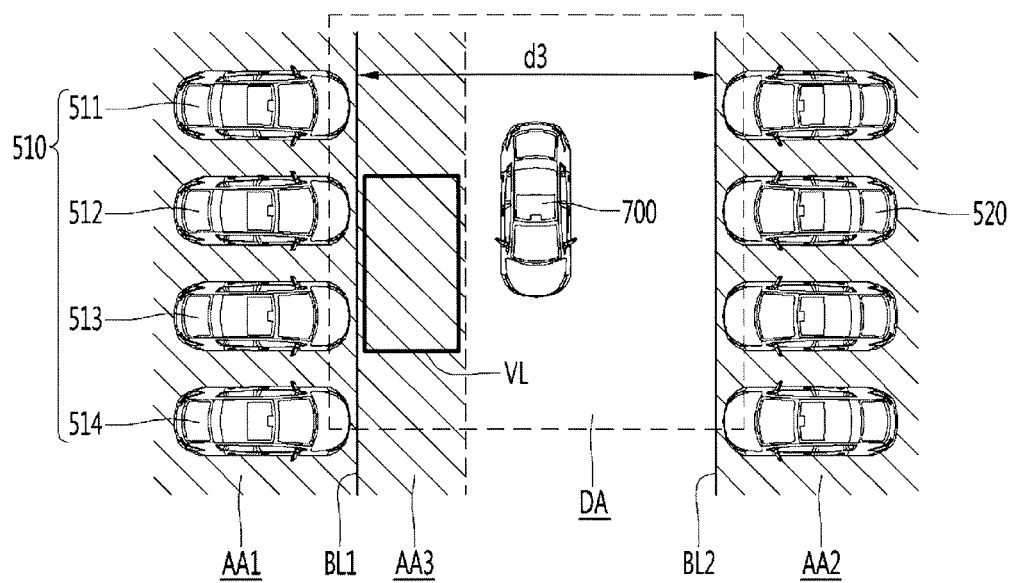
FIG. 19 is a diagram illustrating describing a virtual parking line for double-parking that is generated when other vehicles are arranged in a plurality of rows according to an embodiment of the present invention.
Figure 20:
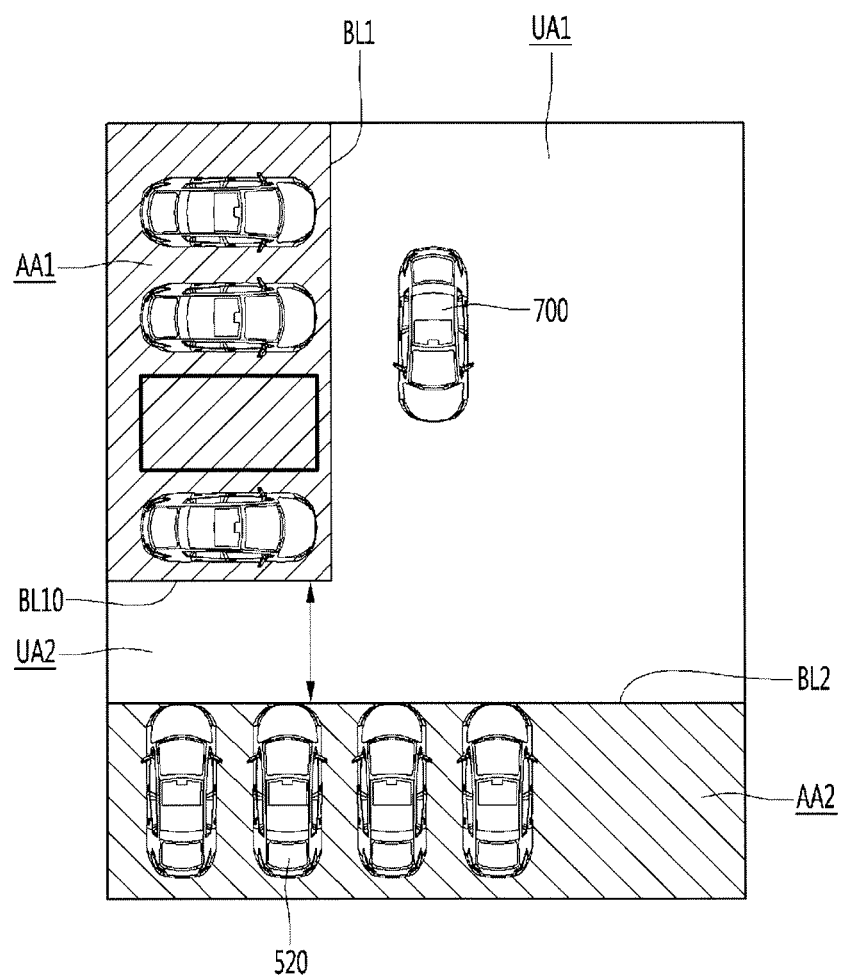
FIG. 20 is a diagram illustrating a parking area and a no parking area, which are distinguished from each other when other vehicles are arranged in a plurality of rows according to an embodiment of the present invention.

Also, as shown in FIG. 19, when a distance between the first boundary line BL1 and the second boundary line BL2 is equal to or greater than a third distance d3, the processor 170 can generate virtual parking lines VL according to the parallel parking method for double-parking. For example, when a distance between the first boundary line BL1 of the first parking area AA1 and the second boundary line BL2 of the second parking area AA2 is a distance d3 that is sufficiently large enough to secure the driving corridor area UA, even after the vehicle 700 is double-parked, a portion of the driving corridor area is set as a third parking area AA3 on the side of the first parking area AA1 and the virtual parking lines VL for the parallel parking method can be generated in the third parking area AA3.

The display area DA displayed in FIG. 19 is an area displayed on the display unit 180. When the user sets a target parking space by touching a candidate parking space defined by the virtual parking lines VL, the parking assistance apparatus 100 can control the vehicle to move to the target parking space, thus achieving automatic parking of the vehicle while ensuring enough room for a driving corridor.

Further, the processor 170 can determine whether it is possible to generate virtual parking lines VL at the outermost position of the first parking area AA1 in consideration of the driving corridor for the other vehicles 510 parked in the second parking area AA2. Specifically, referring to FIG. 20, when a distance between the outermost boundary line of the first parking area AA1 and the boundary line of the second parking area AA2 is equal to or less than a predetermined distance, the processor 170 can set an area between the outermost boundary line BL10 of the first parking area AA1 and the boundary line BL2 of the second parking area AA2 as a second driving corridor area UA2 and prohibit the generation of virtual parking lines VL in this area.

Figure 21:
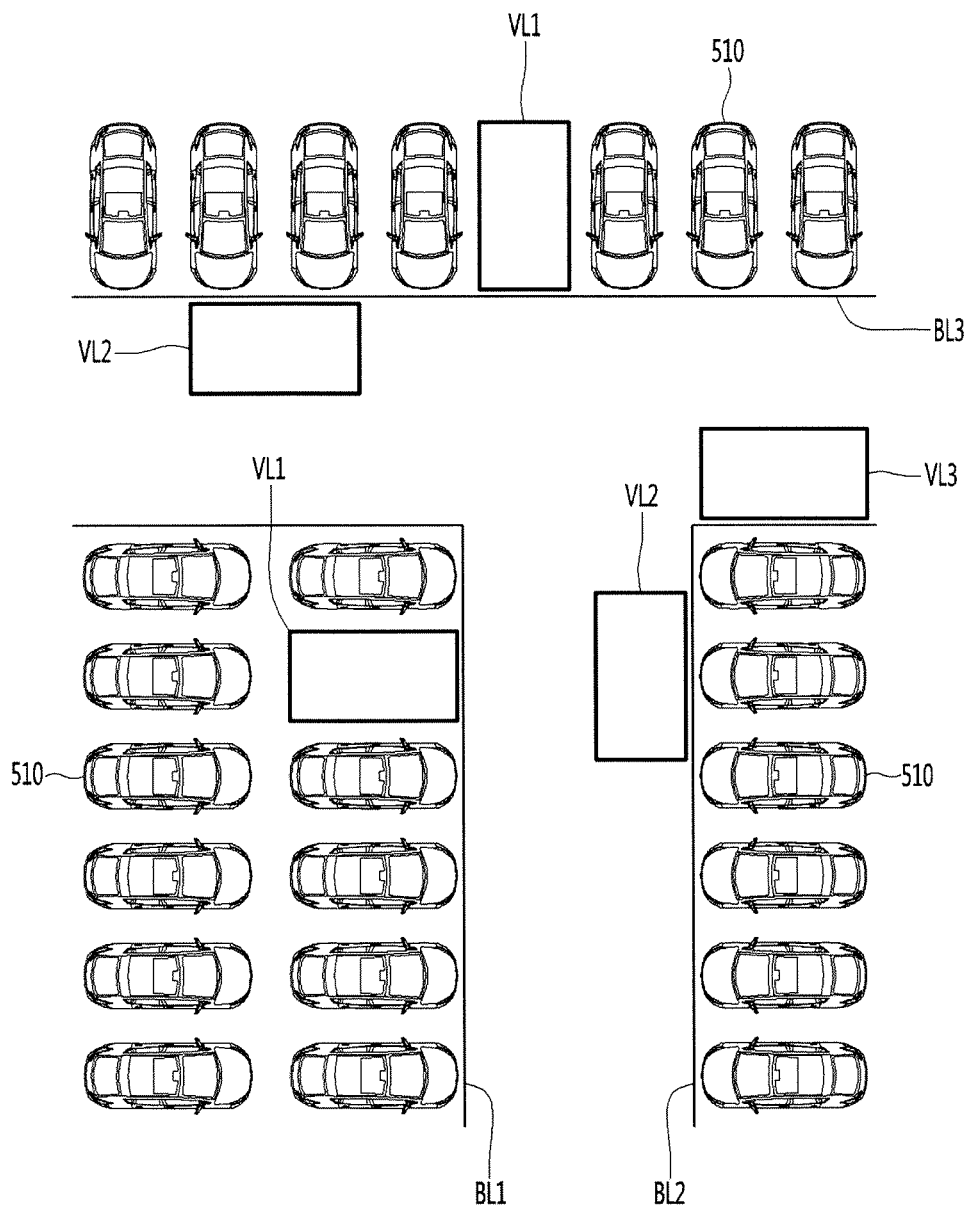
FIG. 21 is a diagram illustrating virtual parking lines that are generated when other vehicles are arranged in a plurality of rows according to an embodiment of the present invention.

Referring to FIG. 21, when there are other vehicles 510 parked according to different parking patterns, it is possible to generate first virtual parking lines VL1 between the other vehicles 510 according to the same parking pattern as other vehicles 510 while securing the driving corridor area UA, generate second virtual parking lines VL2 allowing double-parking with respect to the other vehicles 511, and generate third virtual parking lines VL3 beside the other vehicles 510 located at the outermost positions, which follow the same parking pattern as other vehicles 510.

Figure 22:
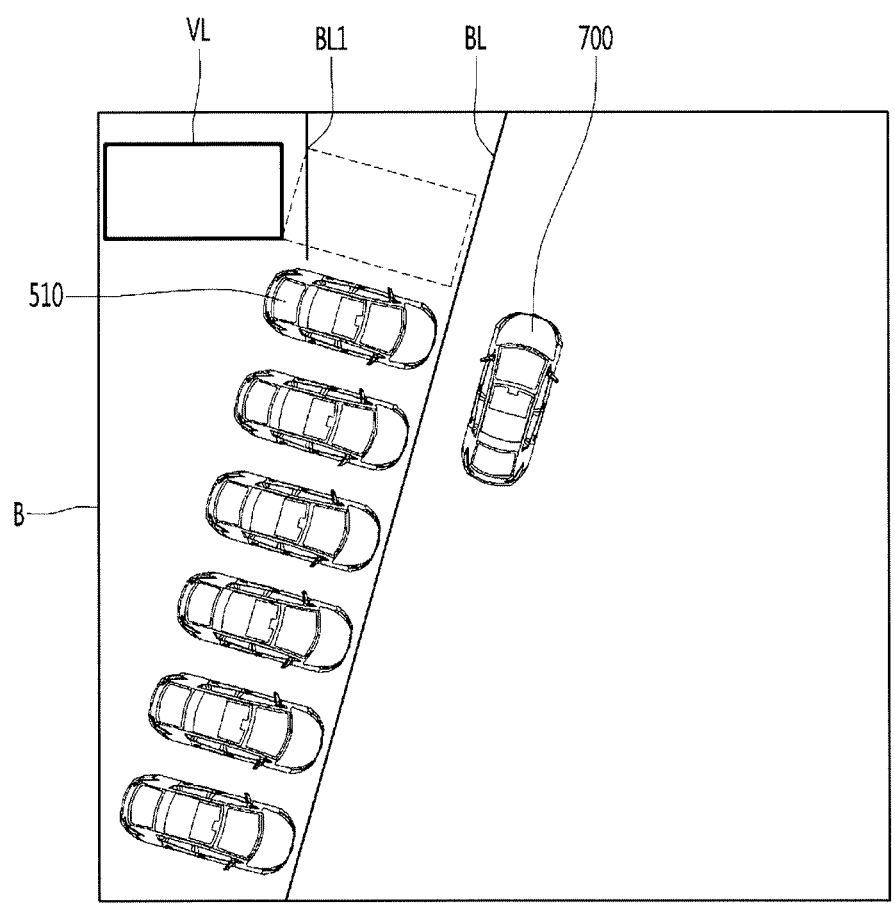
FIG. 22 is a diagram illustrating a virtual parking line that is generated to be misaligned with parking patterns of other vehicles according to another embodiment of the present invention.

In addition, with reference to FIG. 22, the processor 170 can detect the boundary line B of the vehicle surrounding area and the parking pattern of the other vehicles 510 parked in the entire area of a parking lot, and when the boundary line B of the vehicle surrounding area does not match the boundary line BL of the parking pattern of the other vehicles 510, virtual parking lines VL can be generated based on the boundary line of the vehicle surrounding area. That is, referring to FIG. 22, the processor 170 can extract a boundary B of the vehicle surrounding area and when it is detected that the other vehicles are parked at positions that are not aligned with the boundary B of the vehicle surrounding area, the processor 170 can generate the virtual parking lines VL based on the boundary B of the vehicle surrounding area, thus making efficient use of the available space in the parking lot.

Figure 23:
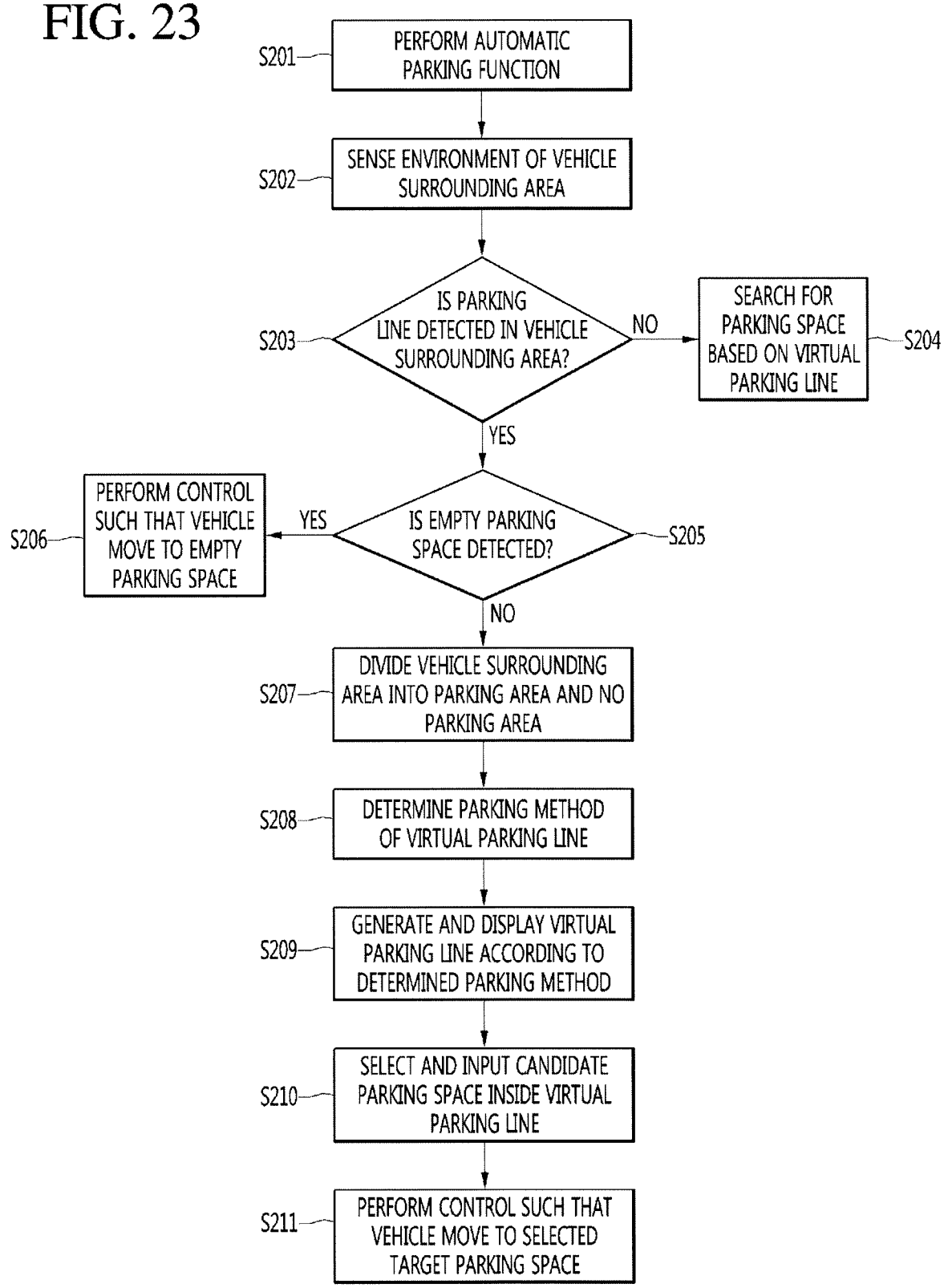
FIG. 23 is a flowchart of a process of providing a virtual parking line-based automatic parking function in a parking lot that has existing parking lines according to an embodiment of the present invention.

In addition, the parking assistance apparatus 100 can generate and display virtual parking lines VL in a space where there are no existing parking lines, in a parking lot that has painted parking lines, in order to provide the virtual line-based automatic parking function. Specifically, referring to FIG. 23, an automatic parking function can be selected by a user (S201). When the input unit 110 detects an input requesting performance of the automatic parking function from the user, the processor 170 can execute the automatic parking function.

When the automatic parking function is performed, the processor 170 can sense the environment of the vehicle surrounding area through the sensor unit 155 (S202). Specifically, the camera can acquire a vehicle surrounding image by photographing the vehicle surrounding area and the processor 170 can acquire information on objects in the vehicle surrounding image by performing image processing and acquire environment information of the vehicle surrounding area.

Also, the processor 170 can generate a 3-dimensional (3D) map for the objects in the vehicle surrounding image as data by combining street information acquired through a street sensor with the vehicle surrounding image and acquire the environment information of the vehicle surrounding area. The environment information of the vehicle surrounding area can include information about various objects located in the vehicle surrounding area, such as curb stones, street trees, lanes, parking signs, parking lines, other vehicles 510 and pedestrians. The environment information of the vehicle surrounding area can further include information about a boundary line of a parking lot, a parking pattern of another vehicle 510, parking lines, lanes, a parking guide sign, a traveling path of a vehicle, a movement direction D of a host vehicle and a traveling pattern or parking pattern of the another vehicle 510.

Based on the environment information of the vehicle surrounding area, the processor 170 can determine whether there are any existing parking lines in the vehicle surrounding area (S203). When there is no parking line, as described above, the processor 170 can search for a parking space based on virtual parking lines VL to provide the automatic parking function (S204).

When there are existing parking lines, the processor 170 can search for an empty parking space inside the existing parking lines (S205). When an empty space is detected inside the parking lines, the processor 170 can set the empty space as a candidate parking space and when the user selects the candidate parking space, control the vehicle to move into the selected candidate parking space (S206). Further, when the processor 170 generates the virtual parking lines VL in an area having no existing parking lines although other parking lines exist in the vehicle surrounding area, the automatic parking function can be provided based on the virtual parking lines VL.

It is noted that, when virtual parking lines VL are thoughtlessly generated in the vehicle surrounding area, the parking space defined by the virtual parking lines VL could be located on the driving corridor. In order to prevent this problem, first, the processor 170 can identify a no parking area UA on which parking is not allowed and a parking area AA on which parking is allowed, in the vehicle surrounding area (S207).

That is, the processor 170 can designate the parking area AA on which parking is allowable an area outside the existing parking lines and generate the virtual parking lines VL only inside the parking area AA. Specifically, the processor 170 can set at least one of a driving corridor area UA, a parking lot entrance surrounding area, a parking lot exit surround area, a building entrance surround area, a pedestrian corridor area, and a no parking sign designation area as the no parking area UA, in the vehicle surrounding area outside the parking line, and set the remaining area as the parking area AA. That is, the processor 170 can determine whether it is possible to generate the virtual parking lines VL in such a way that the parking lines are drawn in consideration of the driving corridor area UA.

Also, the processor 170 can determine whether it is possible to generate the virtual parking lines VL for double-parking in the area outside the parking line, in consideration of the driving corridor area UA. Thereafter, the processor 170 can determine a parking method with respect to the virtual parking lines VL to be generated in the parking area AA (S208).

Specifically, the processor 170 can determine one of a right angle parking method, a parallel parking method, and a diagonal parking method as a parking method for the virtual parking lines VL, based on the size of the parking area AA, the parking pattern of the another vehicle 510, or the like. Further, the processor 170 can generate the virtual parking lines VL in the parking area AA according to the determined parking method and perform control the display unit 180 to display the virtual parking lines VL along with the vehicle surrounding area (S209).

Next, the processor 170 can set one of the generated candidate parking spaces defined by the virtual parking lines VL as a target parking space and control the vehicle to move into the target parking space, thus performing the virtual parking line-based automatic parking function (S210 and S211). Specifically, the processor 170 can detect an empty space among the parking spaces defined by the virtual parking lines VL, determine the empty space as candidate parking space and perform control the display unit 180 to display the candidate parking space.

The processor 170 can receive an input selecting one of the candidate parking spaces through the input unit 110 and set the selected candidate parking space as a target parking space. Subsequently, the processor 170 designs a parking path for directing the vehicle from a current position to the target parking space and controls the vehicle to follow the parking path by controlling the steering, engine power, braking, or the like of the vehicle, thus performing automatic parking.

Figure 24:
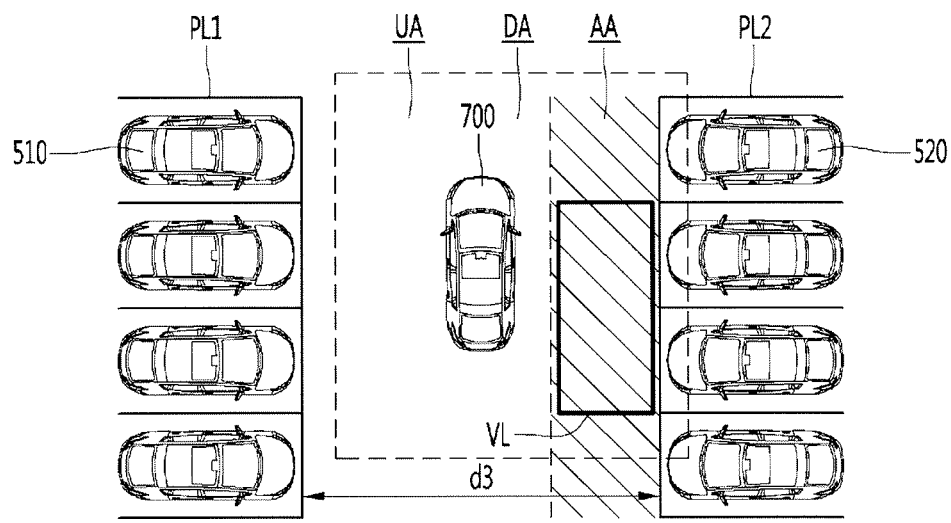
FIG. 24 is a diagram illustrating describing a virtual parking line for double-parking that is generated according to an embodiment of the present invention.

Specifically, referring to FIG. 24, when a distance between a first parking line PL1 located on the left side of the vehicle 700 and a second parking line PL2 located on the right side is equal to or greater than a third distance d3, the processor 170 can set a part of the driving corridor area UA between the first parking line PL1 and the second parking line PL2 as the parking area AA. Further, the processor 170 can generate the virtual parking lines VL according to the parallel parking method for double-parking in the parking area AA.

Figure 25:
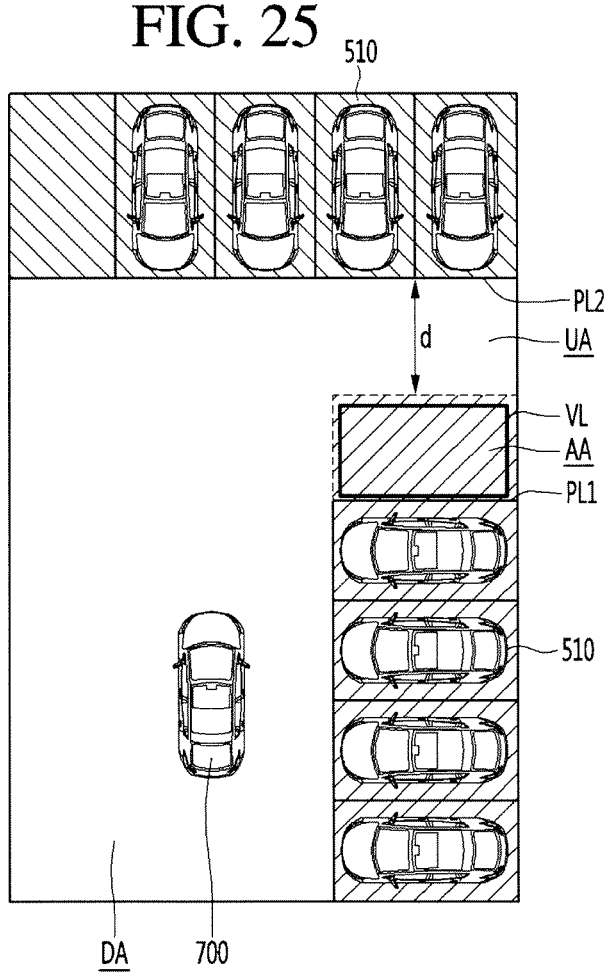
FIG. 25 is a diagram illustrating a virtual parking line that is generated by extending a parking space from existing parking lines according to an embodiment of the present invention.

Also, referring to FIG. 25, when an area outside the existing parking line PL1 located at the outermost position of the existing parking lines is determined as the parking area AA, the processor 170 can generate virtual parking lines VL extend from the parking line PL1. Specifically, the processor 170 can calculate a size of the driving corridor area UA adjacent to the outermost parking line PL1, when the size of the driving corridor area UA is large enough to secure an additional virtual parking space, the processor 170 can designate the area adjacent to the outermost existing parking line PL1 as the parking area and generate virtual parking lines VL for a new parking space.

The display area DA displayed in FIGS. 24 and 25 is an area displayed on the display unit 180. When the user sets a target parking space by touching a candidate parking space defined by the virtual parking lines VL, the parking assistance apparatus 100 can control the vehicle to move to the target parking space, thus achieving automatic parking of the vehicle while ensuring enough space for a driving corridor.

Figure 26:
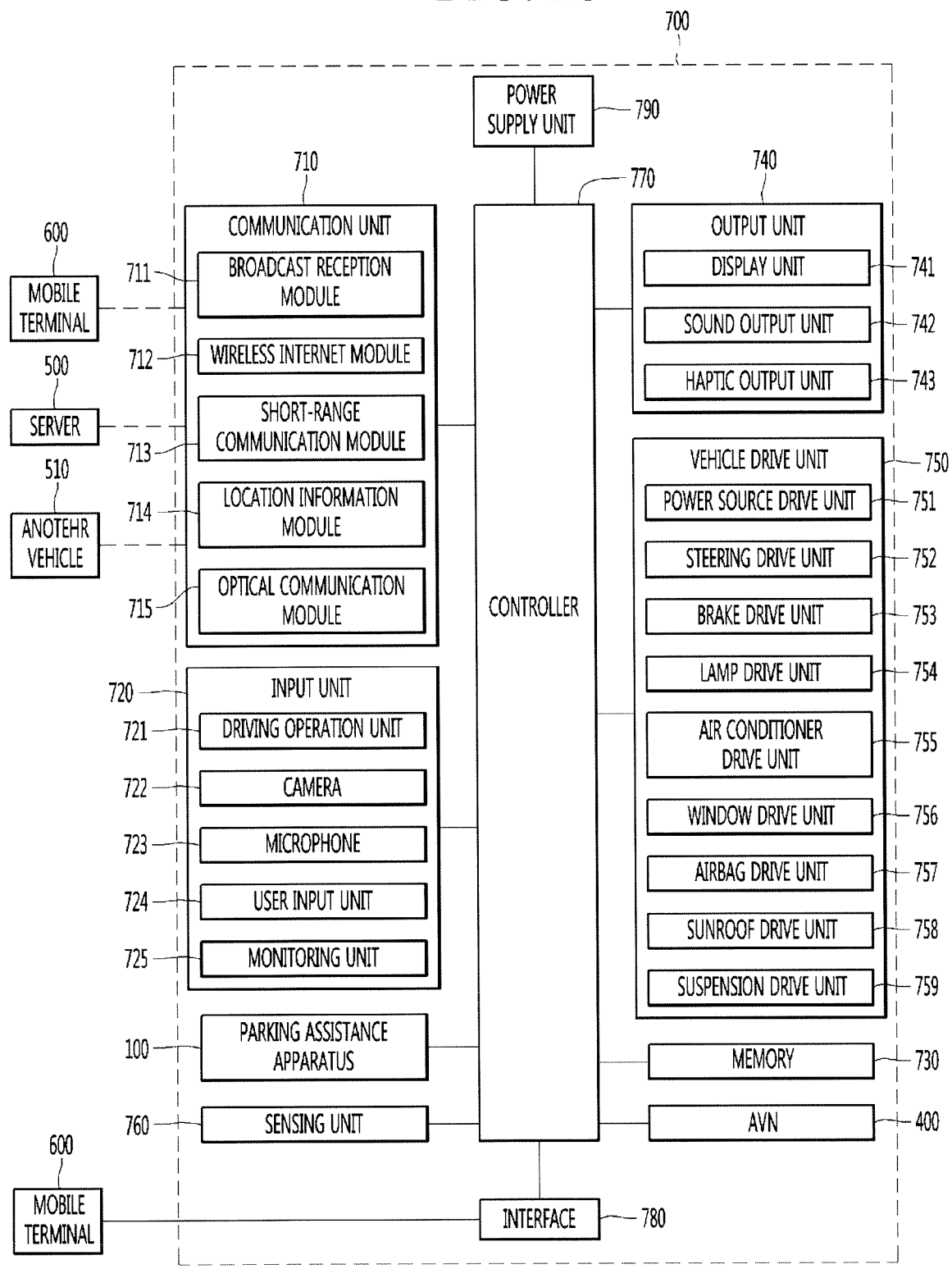
FIG. 26 is a block diagram showing the internal configuration of the vehicle having the parking assistance apparatus shown in FIG. 1.

Referring to FIG. 26, the above-described parking assistance apparatus 100 CAN be included in the vehicle 700. The vehicle 700 CAN include a communication unit 710, an input unit 720, a sensing unit 760, an output unit 740, a vehicle drive unit 750, a memory 730, an interface 780, a controller 770, a power supply unit 790, a parking assistance apparatus 100 and AVN apparatus 400. Here, among the units included in the parking assistance apparatus 100 and the units of the vehicle 700, the units having the same names are described as being included in the vehicle 700.

The communication unit 710 CAN include one or more modules which permit communication, such as wireless communication between the vehicle and the mobile terminal 600, between the vehicle and the external server 50 or between the vehicle and the other vehicle 510. Further, the communication unit 710 can include one or more modules which connect the vehicle to one or more networks.

The communication unit 710 includes a broadcast receiving module 711, a wireless Internet module 712, a short-range communication module 713, and an optical communication module 715. The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 can transmit/receive data according to one or more of such wireless Internet technologies, and other Internet technologies as well. For example, the wireless Internet module 712 can wirelessly exchange data with the external server 500. The wireless Internet module 712 can receive weather information and road traffic state information (e.g., transport protocol experts group (TPEG) information) from the external server 500.

The short-range communication module 713 is configured to facilitate short-range communication. Such short-range communication can include at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

The short-range communication module 713 can form a wireless local area network to perform short-range communication between the vehicle and at least one external device. For example, the short-range communication module 713 can wirelessly exchange data with the mobile terminal 600. The short-range communication module 713 can receive weather information and road traffic state information (e.g., transport protocol experts group (TPEG) information) from the mobile terminal 600. When a user rides in the vehicle, the mobile terminal 600 of the user and the vehicle can pair with each other automatically or by executing the application of the user.

A location information module 714 acquires the location of the vehicle and a representative example thereof includes a global positioning system (GPS) module. For example, the vehicle can acquire the location of the vehicle using a signal received from a GPS satellite upon utilizing the GPS module.

The optical communication module 715 can include a light emitting unit and a light reception unit. The light reception unit can convert a light signal into an electric signal and receive information. The light reception unit can include a photodiode (PD) for receiving light. The photodiode can covert light into an electric signal. For example, the light reception unit can receive information on a preceding vehicle through light emitted from a light source included in the preceding vehicle.

The light emitting unit can include at least one light emitting element for converting electrical signals into a light signal. Here, the light emitting element can be a Light Emitting Diode (LED). The light emitting unit converts electrical signals into light signals to emit the light. For example, the light emitting unit can externally emit light via flickering of the light emitting element corresponding to a prescribed frequency. In some embodiments, the light emitting unit may include an array of a plurality of light emitting elements. In some embodiments, the light emitting unit can be integrated with a lamp provided in the vehicle. For example, the light emitting unit can be at least one selected from among a headlight, a taillight, a brake light, a turn signal, and a sidelight. For example, the optical communication module 715 can exchange data with the other vehicle 510 via optical communication.

The input unit 720 can include a driving operation unit 721, a camera 195, a microphone 723 and a user input unit 724. The driving operation unit 721 receives user input for driving of the vehicle (see FIG. 7). The driving operation unit 721 can include a steering input unit 721A, a shift input unit 721D, an acceleration input unit 721C and a brake input unit 721B.

The steering input unit 721A is configured to receive user input with regard to the direction of travel of the vehicle. The steering input unit 721A can include a steering wheel using rotation. In some embodiments, the steering input unit 721A can be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D can have a lever form. In some embodiments, the shift input unit 721D can be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B can have a pedal form. In some embodiments, the acceleration input unit 721C or the brake input unit 721B can be configured as a touchscreen, a touch pad, or a button.

The camera 722 can include an image sensor and an image processing module. The camera 722 can process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle can include the camera 722 for capturing the front image of the vehicle or the image of the vicinity of the vehicle and the monitoring unit 725 for capturing the image of the space inside the vehicle.

The monitoring unit 725 can acquire an image of a passenger. The monitoring unit 725 can acquire an image for biometric information of the passenger. Although the monitoring unit 725 and the camera 722 are included in the input unit 720 in FIG. 26, the camera 722 can be included in the parking assistance apparatus 100 as described above.

The microphone 723 can process external sound signals into electrical data. The processed data can be utilized in various ways according to a function that the vehicle is performing. The microphone 723 can convert a user voice command into electrical data. The converted electrical data may be transmitted to the controller 770. Meanwhile, in some embodiments, a camera 722 or the microphone 723 may not be included in the input unit 720 but can be included in the sensing unit 760.

The user input unit 724 is configured to receive information from the user. When information is input via the user input unit 724, the controller 770 can control the operation of the vehicle to correspond to the input information. The user input unit 724 can include a touch input unit or a mechanical input unit. In some embodiments, the user input unit 724 can be located in a region of the steering wheel. In this instance, the driver can operate the user input unit 724 with the fingers while gripping the steering wheel.

The sensing unit 760 is configured to sense signals associated with, for example, signals related to driving of the vehicle. Thus, the sensing unit 760 can include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, radar, Lidar, etc.

As such, the sensing unit 760 can acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc. Also, the sensing unit 760 can further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 can include a biometric sensor. The biometric sensor senses and acquires biometric information of the passenger. The biometric information can include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 can operate as a sensor. The biometric sensor can acquire hand geometry information and facial recognition information through the monitoring unit 725.

The output unit 740 is configured to output information processed by the controller 770. The output unit 740 can include a display unit 741, a sound output unit 742, and a haptic output unit 743.

The display unit 741 can display information processed by the controller 770. For example, the display unit 741 can display vehicle associated information. Here, the vehicle associated information can include vehicle control information for direct control of the vehicle or driver assistance information for aiding in driving of the vehicle. In addition, the vehicle associated information can include vehicle state information that indicates the current state of the vehicle or vehicle traveling information regarding traveling of the vehicle. The display unit 741 can include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 can configure an inter-layer structure with a touch sensor, or may be integrally formed with the touch sensor to implement a touchscreen. The touchscreen can function as the user input unit 724 which provides an input interface between the vehicle and the user and also function to provide an output interface between the vehicle and the user. In this instance, the display unit 741 can include a touch sensor which senses a touch to the display unit 741 so as to receive a control command in a touch manner. When a touch is input to the display unit 741 as described above, the touch sensor can sense the touch and the controller 770 can generate a control command corresponding to the touch. Content input in a touch manner can be characters or numbers, or may be, for example, instructions in various modes or menu items that may be designated.

Meanwhile, the display unit 741 can include a cluster to allow the driver to check vehicle state information or vehicle traveling information while driving the vehicle. The cluster can be located on a dashboard. In this instance, the driver can check information displayed on the cluster while looking forward.

Meanwhile, in some embodiments, the display unit 741 can be implemented as a head up display (HUD). When the display unit 741 is implemented as a HUD, information can be output via a transparent display provided at the windshield. Alternatively, the display unit 741 can include a projector module to output information via an image projected onto the windshield.

The sound output unit 742 is configured to convert electrical signals from the controller 170 into audio signals and to output the audio signals. Thus, the sound output unit 742 can include, for example, a speaker. The sound output unit 742 can output sound corresponding to the operation of the user input unit 724.

The haptic output unit 743 is configured to generate tactile output. For example, the haptic output unit 743 can operate to vibrate a steering wheel, a safety belt, or a seat so as to allow the user to recognize an output thereof.

The vehicle drive unit 750 can control the operation of various devices of the vehicle. The vehicle drive unit 750 can include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 can perform electronic control of a power source inside the vehicle. For example, where a fossil fuel based engine is a power source, the power source drive unit 751 can perform electronic control of the engine. As such, the power source drive unit 751 can control, for example, an output torque of the engine. In the case where the power source drive unit 751 is an engine, the power source drive unit 751 can control the speed of the vehicle by controlling the output torque of the engine under the control of the controller 770.

In another example, in which an electric motor is a power source, the power source drive unit 751 can perform control of the motor. As such, the power source drive unit 751 can control, for example, the RPM and torque of the motor.

The steering drive unit 752 can perform electronic control of a steering apparatus inside the vehicle. The steering drive unit 752 can change the direction of travel of the vehicle.

The brake drive unit 753 can perform electronic control of a brake apparatus inside the vehicle. For example, the brake drive unit 753 can reduce the speed of the vehicle by controlling the operation of brakes located at wheels. In another example, the brake drive unit 753 can adjust the direction of travel of the vehicle leftward or rightward by differentiating the operation of respective brakes located at left and right wheels.

The lamp drive unit 754 can turn at least one lamp arranged inside and outside the vehicle on or off. In addition, the lamp drive unit 754 can control, for example, the intensity and direction of light of each lamp. For example, the lamp drive unit 754 can perform control of a turn signal lamp or a brake lamp.

The air conditioner drive unit 755 can perform electronic control of an air conditioner inside the vehicle. For example, when the interior temperature of the vehicle is high, the air conditioner drive unit 755 can operate the air conditioner to supply cold air to the interior of the vehicle.

The window drive unit 756 can perform electronic control of a window apparatus inside the vehicle. For example, the window drive unit 756 can control opening or closing of left and right windows of the vehicle.

The airbag drive unit 757 can perform the electronic control of an airbag apparatus inside the vehicle. For example, the airbag drive unit 757 can control an airbag to be deployed in a dangerous situation.

The sunroof drive unit 758 can perform electronic control of a sunroof apparatus inside the vehicle. For example, the sunroof drive unit 758 can control opening or closing of a sunroof.

The suspension drive unit 759 can perform electronic control of a suspension apparatus inside the vehicle. For example, when a road surface is uneven, the suspension drive unit 759 can control the suspension apparatus to reduce vibrations of the vehicle.

The memory 730 is electrically connected to the controller 770. The memory 730 can store basic data of the unit, control data for operation control of the unit and input/output data. The memory 730 can be various storage apparatuses, which are implemented in a hardware manner, such as a ROM, RAM, EPROM, flash drive and hard drive. The memory 730 can store a variety of data for overall operation of the vehicle, such as a program for processing or control of the controller 770.

The interface 780 can serve as a passage for various kinds of external devices that are connected to the vehicle. For example, the interface 780 can have a port that is connectable to the mobile terminal 600 and can be connected to the mobile terminal 600 via the port. In this instance, the interface 780 can exchange data with the mobile terminal 600.

The interface 780 can serve as a passage for providing electric energy to the connected mobile terminal 600. When the mobile terminal 600 is electrically connected to the interface 780, the interface 780 can provide electric energy supplied from the power supply unit 790 to the mobile terminal 600 under control of the controller 770.

The controller 770 can control the overall operation of each unit inside the vehicle. The controller 770 can be referred to as an Electronic Control Unit (ECU).

The controller 770 can perform a function corresponding to the delivered signal according to delivery of a signal for executing the parking assistance apparatus 100. The controller 770 can be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 can perform the role of the above-described processor 170. That is, the processor 170 of the parking assistance apparatus 100 can be directly set in the controller 770 of the vehicle. In such an embodiment, the parking assistance apparatus 100 may be understood as a combination of some components of the vehicle. Alternatively, the controller 770 may control the components to transmit information requested by the processor 170.

The power supply unit 790 can supply power required to operate the respective components under the control of the controller 770. In particular, the power supply unit 790 can receive power from, for example, a battery inside the vehicle.

The AVN apparatus 400 can exchange data with the controller 770. The controller 770 can receive navigation information from the AVN apparatus or a separate navigation apparatus. Here, the navigation information can include destination information, information on a route to the destination, map information related to vehicle traveling and current position information of the vehicle.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just examples and do not limit the present invention. Thus, those skilled in the art to which the present invention pertains will know that various modifications and applications which have not been exemplified may be performed within a range which does not deviate from the essential characteristics of the embodiments. For instance, the constituent elements described in detail in the example embodiments can be modified. Further, the differences related to such modifications and applications shall be construed to be included in the scope of the present invention specified in the attached claims.

What is claimed is:

1. A parking assistance apparatus comprising:
   a sensor configured to sense environment information of a vehicle surrounding area;
   a display configured to display an image of the vehicle surrounding area; and
   a processor configured to:
   determine a parking area within the vehicle surrounding area on which parking is allowable,
   generate virtual parking lines within the parking area, and control the display to display the virtual parking lines,
   receive an input selecting a candidate parking space within the virtual parking lines,
   set the selected candidate parking space as a target parking position, and
   control a vehicle to be driven to the target parking position,
   wherein the processor is further configured to:
   detect a parking pattern of a parked vehicle within the vehicle surrounding area,
   determine a boundary line based on, boundary surfaces of the parked vehicle,
   set an area inside the boundary line including the parked vehicle as the parking area, and
   set an area up to a predetermined distance away from the boundary line as a driving corridor area,
   wherein the processor is further configured to:
   detect a first parking pattern of a first row of parked vehicles on one side of the vehicle surrounding area and a second parking pattern of a second row of parked vehicles on another side of the vehicle surrounding area,
   determine a first boundary line based on the first parking pattern,
   determine a second boundary line based on the second parking pattern,
   divide the vehicle surrounding area into the parking area and a no parking area based on the first boundary line and the second boundary line, and
   generate the virtual parking lines in the parking area based on the first and second parking patterns, and
   wherein the processor is further configured to generate the virtual parking lines for a parallel parking method for double parking when a distance between the first boundary line and the second boundary is greater than or equal to a predetermined distance.

2. The parking assistance apparatus of claim 1, wherein the processor is further configured to divide the vehicle surrounding area into the parking area on which parking is allowable and a no parking area on which parking is not allowable based on the environment information of the vehicle surrounding area that is sensed by the sensor, and wherein the environmental information includes information about at least one of a parking pattern of another vehicle, a lane, a parking sign, a vehicle driving path, a vehicle moving direction, and another vehicle driving pattern.

3. The parking assistance apparatus of claim 2, wherein the processor is further configured to set at least one of the driving corridor area, a parking lot entrance surrounding area, a building entrance surrounding area, a pedestrian corridor area, and a no parking sign designation area as the no parking area.

4. The parking assistance apparatus of claim 3, wherein the processor is further configured to determine the driving corridor area based on a vehicle driving path, a vehicle moving direction, and another vehicle parking pattern in the vehicle surrounding area.

5. The parking assistance apparatus of claim 1, wherein the processor is further configured to set a first area extending from a first boundary line of the vehicle surrounding area to a first predetermined distance as the parking area and set a second area extending from a second boundary line of the parking area to a second predetermined distance as the driving corridor area.

6. The parking assistance apparatus of claim 5, wherein the processor is further configured to determine a parking method based on a distance between the first boundary line of the vehicle surrounding area and the second boundary line of the parking area and generate the virtual parking lines based on the parking method and to correspond with the first boundary line.

7. The parking assistance apparatus of claim 1, wherein the processor is further configured to:
   in response to detecting a parked vehicle in the vehicle surrounding area, determine a boundary surface of the parked vehicle based on a moving direction of the vehicle and a parking pattern of the parked vehicle,
   set a first area extending in a first direction away from an inner boundary line based on the boundary surface of the parked vehicle as the parking area, and
   set a second area extending in a second direction away from the inner boundary line to a predetermined distance as a driving corridor area.

8. The parking assistance apparatus of claim 1, wherein the processor is further configured to detect a parking method based on the parking pattern of the parked vehicles and generate the virtual parking lines in the parking area based on the detected parking method.

9. The parking assistance apparatus of claim 1, wherein the processor is further configured to set an area outside the driving corridor area as the parking area and generate the virtual parking lines in the parking area.

10. The parking assistance apparatus of claim 1, wherein the processor is configured to:
    receive an input for automatic double parking execution,
    set a portion of the driving corridor area as the parking area, and generate virtual parking lines for a parallel parking method in the portion of the driving corridor.

11. The parking assistance apparatus of claim 1, wherein the display is configured to display an image of the vehicle surrounding area that is divided into the parking area and the no parking area.

12. The parking assistance apparatus of claim 1, wherein the processor is further configured to:
    determine a parking method according to a shape of the parking area, and
    generate the virtual parking lines according to the parking method.

13. The parking assistance apparatus of claim 1, wherein the processor is further configured to generate the virtual parking lines based on a parking pattern of a parked vehicle and extend the parking pattern of the parked vehicle with the virtual parking lines to form the candidate parking space.

14. The parking assistance apparatus of claim 1, wherein the processor is further configured to detect existing parking lines from environmental information on the vehicle surrounding area acquired through the sensor, and determine the parking area and the no parking area based on the existing parking lines.

15. A vehicle comprising the parking assistance apparatus of claim 1.

16. A parking assistance apparatus comprising:
a sensor configured to obtain environment information of a vehicle surrounding area;
a display configured to display an image of the vehicle surrounding area; and
a processor configured to:
determine a boundary line within the vehicle surrounding area based on the environment information,
divide the surrounding area into a parking area that extends from one side of the boundary line on which parking is allowable and a no parking area that extends from the other side of the boundary line on which parking is not allowable,
display virtual parking lines in the parking area on the image of the vehicle surrounding area,
receive an input selecting a candidate parking space within the virtual parking lines,
set the selected candidate parking space as a target parking position, and
control a vehicle to move to the target parking position,
wherein the processor is further configured to:
detect a parking pattern of a parked vehicle within the vehicle surrounding area,
determine the boundary line based on the parking pattern,
set an area inside the boundary line including the parked vehicle as the parking area, and
set an area up to a predetermined distance away from the boundary line as a driving corridor area,
wherein the processor is further configured to:
detect a first parking pattern of a first row of parked vehicles on one side of the vehicle surrounding area and a second parking pattern of a second row of parked vehicles on another side of the vehicle surrounding area,
determine a first boundary line based on the first parking pattern,
determine a second boundary line based on the second parking pattern,
divide the vehicle surrounding area into the parking area and a no parking area based on the first boundary line and the second boundary line, and
generate the virtual parking lines in the parking based on the first and second parking patterns, and
wherein the processor is further configured to generate the virtual parking lines for a parallel parking method for double parking when a distance between the first boundary line and the second boundary is greater than or equal to a predetermined distance.

17. A parking assistance apparatus comprising:
a sensor configured to sense environment information of a vehicle surrounding area;
a display configured to display an image of the vehicle surrounding area; and
a processor configured to:
determine a parking area within the vehicle surrounding area on which parking is allowable,
generate virtual parking lines within the parking area, and control the display to display the virtual parking lines,
receive an input selecting a candidate parking space within the virtual parking lines,
set the selected candidate parking space as a target parking position, and
control a vehicle to be driven to the target parking position,
wherein the processor is further configured to:
detect a first parking pattern of a first row of parked vehicles on one side of the vehicle surrounding area and a second parking pattern of a second row of parked vehicles on another side of the vehicle surrounding area,
determine a first boundary line based on the first parking pattern,
determine a second boundary line based on the second parking pattern,
divide the vehicle surrounding area into the parking area and a no parking area based on the first boundary line and the second boundary line, and
generate the virtual parking lines in the parking area based on the first and second parking patterns, and
wherein the processor is further configured to generate the virtual parking lines for a parallel parking method for double parking when a distance between the first boundary line and the second boundary is greater than or equal to a predetermined distance.

* * * * *